United States Patent
Yasumura

(10) Patent No.: US 7,656,686 B2
(45) Date of Patent: Feb. 2, 2010

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 405 days.

(21) Appl. No.: 11/713,563

(22) Filed: Mar. 1, 2007

(65) Prior Publication Data

US 2007/0236963 A1  Oct. 11, 2007

(30) Foreign Application Priority Data

Mar. 3, 2006 (JP) ............................ P2006-057756

(51) Int. Cl.
*H02M 3/335* (2006.01)
*H02M 3/24* (2006.01)
(52) U.S. Cl. ...................................... 363/21.02; 363/97
(58) Field of Classification Search .................. 363/20, 363/21.01–21.04, 21.08, 89, 95, 97, 131; 323/207
See application file for complete search history.

(56) References Cited

U.S. PATENT DOCUMENTS

| | | | | |
|---|---|---|---|---|
| 6,310,786 B1 * | 10/2001 | Yasumura | ................ | 363/21.03 |
| 6,396,717 B2 * | 5/2002 | Yasumura | ................ | 363/21.02 |
| 6,839,245 B2 * | 1/2005 | Yasumura | ................ | 363/21.02 |
| 7,423,887 B2 * | 9/2008 | Yasumura | ................ | 363/21.02 |
| 2003/0095419 A1 * | 5/2003 | Yasumura | ................ | 363/21.02 |
| 2005/0281059 A1 * | 12/2005 | Yasumura | .................... | 363/16 |
| 2007/0195560 A1 * | 8/2007 | Yasumura | ................ | 363/21.01 |
| 2008/0025052 A1 * | 1/2008 | Yasumura | ................ | 363/21.04 |

FOREIGN PATENT DOCUMENTS

JP     06-327246 A     11/1994

* cited by examiner

*Primary Examiner*—Bao Q Vu
*Assistant Examiner*—Jue Zhang
(74) *Attorney, Agent, or Firm*—Lerner, David, Littenberg, Krumholz & Mentlik, LLP

(57) ABSTRACT

There is provided a switching power supply circuit which may include a rectifying and smoothing section for converting an alternating input voltage from an alternating-current power supply into a primary side direct-current voltage; a converter section for converting the primary side direct-current voltage from the rectifying and smoothing section into an alternating voltage and further converting the alternating voltage into a secondary side direct-current voltage; and a power factor improving section for improving a power factor.

9 Claims, 24 Drawing Sheets

FIG. 25A (RELATED ART) Vin Iin

FIG. 25B (RELATED ART) Pin Pchg

FIG. 25C (RELATED ART) ichg

FIG. 25D (RELATED ART) Vout

UNDER LIGHT LOAD (DISCONTINUOUS MODE) { $I_{101}$, $Q_{103}$ ON/OFF }

UNDER MEDIUM LOAD (CRITICAL MODE) { $I_{101}$, $Q_{103}$ ON/OFF }

UNDER HEAVY LOAD (CONTINUOUS MODE) { $I_{101}$, $Q_{103}$ ON/OFF }

SWITCHING POWER SUPPLY CIRCUIT

CROSS-REFERENCE TO RELATED APPLICATIONS

This application claims priority from Japanese Patent Application No. JP 2006-057756, filed in the Japanese Patent Office on Mar. 3, 2006, the entire content of which is incorporated herein by reference.

BACKGROUND OF THE INVENTION

1. Field of the Invention

The present invention relates to a switching power supply circuit provided as a power supply for various electronic devices.

2. Description of the Related Art

Most of power supply circuits that rectify commercial alternating-current power and provide desired direct-current voltage have recently been switching type power supply circuits. A switching power supply circuit has a transformer and other devices miniaturized by increasing switching frequency, and is used as a power supply for various electronic devices as a high-power DC-to-DC converter.

The commercial alternating-current power is a sinusoidal alternating voltage. When a smoothing and rectifying circuit using a rectifying element and a smoothing capacitor rectifies and smoothes the commercial alternating-current power, due to a peak hold effect of the smoothing and rectifying circuit, a current flows from the commercial alternating-current power supply to the switching power supply circuit only during a short period around a peak voltage of the alternating voltage, and the current flowing from the commercial alternating-current power supply to the switching power supply circuit has a distorted waveform that differs greatly from a sinusoidal wave. Then a power factor indicating efficiency of use of the power supply is deteriorated. In addition, a measure is required to suppress harmonics of the cycle of the commercial alternating-current power which harmonics result from such a distorted current waveform. A method using a so-called active filter to solve these problems is known as a conventional technology for improving the power factor (for example Japanese Patent Laid-Open No. Hei 6-327246).

FIG. 24 shows a basic configuration of such an active filter. In FIG. 24, a primary side rectifying element Di formed as a bridge rectifier is connected to a commercial alternating-current power supply AC. A step-up type converter is connected to the positive electrode/negative electrode line of the primary side rectifying element Di. A smoothing capacitor Cout is connected in parallel with the output of the converter. A direct-current voltage Vout is obtained as voltage across the smoothing capacitor Cout. The direct-current voltage Vout is supplied as input voltage to a load 110 such for example as a DC-to-DC converter in a subsequent stage.

A configuration for power factor improvement includes: the step-up type converter composed of an inductor L, a fast recovery type fast switching diode D, and a switching element Q; and a control section for the step-up type converter, the control section having a multiplier 111 as a main component. The inductor L and the fast switching diode D are inserted between the positive electrode output terminal of the primary side rectifying element Di and the positive electrode terminal of the smoothing capacitor Cout in a state of being connected in series with each other. A resistance Ri is inserted between the negative electrode output terminal of the primary side rectifying element Di (primary side ground) and the negative electrode terminal of the smoothing capacitor Cout. The switching element Q is a MOS-FET, for example. The switching element Q is inserted between a point of connection between the inductor L and the fast switching diode D and the primary side ground.

The multiplier 111 is connected with a current detection line LI, a waveform input line Lw, and a voltage detection line Lv. The multiplier 111 detects a signal corresponding to a rectified current Iin flowing through the negative electrode output terminal of the primary side rectifying element Di from across the resistance Ri, the signal being input from the current detection line LI. In addition, the multiplier 111 detects a signal corresponding to a rectified voltage Vin at the positive electrode output terminal of the primary side rectifying element Di, the signal being input from the waveform input line Lw. This rectified voltage Vin is obtained by converting the waveform of an alternating input voltage VAC from the commercial alternating-current power supply AC into an absolute value. Further, the multiplier 111 detects a variation difference of the direct-current input voltage (a signal obtained by amplifying a difference between a predetermined reference voltage and the direct-current voltage Vout will be referred to as a variation difference, which will hereinafter be used similarly) on the basis of the direct-current voltage Vout of the smoothing capacitor Cout, the direct-current voltage Vout being input from the voltage detection line Lv. Then, a drive signal for driving the switching element Q is output from the multiplier 111.

The multiplier 111 multiplies together the signal corresponding to the rectified current Iin, the signal being detected from the current detection line LI, and the variation difference of the direct-current input voltage, the variation difference being detected from the voltage detection line Lv. The multiplier 111 detects an error between a result of the multiplication and the signal corresponding to the rectified voltage Vin, the signal being detected from the waveform input line Lw. After amplifying the error signal, the multiplier 111 performs a PWM (Pulse Width Modulation) conversion, and controls the switching element Q by a binary signal having a high level and a low level. Thus, a two-input feedback system is formed, the value of the direct-current voltage Vout is made to be a predetermined value, and the rectified current Iin is made to have a waveform similar to that of the rectified voltage Vin. As a result, the waveform of the alternating voltage applied from the commercial alternating-current power supply AC to the primary side rectifying element Di and the waveform of the alternating current flowing into the primary side rectifying element Di are also similar to each other, so that the power factor approaches substantially one. Thus power factor improvement is achieved.

FIG. 25A shows the rectified voltage Vin and the rectified current Iin when the active filter circuit shown in FIG. 24 operates properly. FIG. 25B shows change Pchg in energy (power) input and output to and from the smoothing capacitor Cout. A broken line represents an average value Pin of the input and output energy (power). That is, the smoothing capacitor Cout stores energy when the rectified voltage Vin is high, and the smoothing capacitor Cout releases energy when the rectified voltage Vin is low. The smoothing capacitor Cout thereby maintains a flow of output power. FIG. 25C shows the waveform of a charging and discharging current Ichg of the smoothing capacitor Cout. FIG. 25D shows the direct-current voltage Vout as voltage across the smoothing capacitor Cout. The direct-current voltage Vout is a direct-current voltage (for example a direct-current voltage of 375 V) on which a ripple voltage including a second harmonic component of the cycle of the rectified voltage Vin as a main component is superimposed.

FIG. 26 shows an example of configuration of a power supply circuit formed by connecting a current resonant converter in a stage following an active filter based on the configuration shown in FIG. 24. The power supply circuit shown in FIG. 26 has a configuration that can deal with load power Po in a range of 300 W to 0 W when the value of the alternating input voltage VAC is in a range of 85 V to 264 V. The current resonant converter employs the configuration of an externally excited half-bridge coupling system.

The power supply circuit shown in FIG. 26 will be described in order from an alternating current input side. A common mode noise filter formed by two line filter transformers LFT and three across capacitors CL is provided. A primary side rectifying element Di is connected in a stage subsequent to the common mode noise filter. A pi-configuration normal mode noise filter 125 formed by connecting an inductor LN and filter capacitors (film capacitors) CN is connected to the rectified output line of the primary side rectifying element Di.

The positive electrode output terminal of the primary side rectifying element Di is connected to the positive electrode terminal of a smoothing capacitor Ci via a series connection of the inductor LN, a choke coil PCC (functioning as an inductor Lpc), and a fast recovery type fast switching diode D20. The smoothing capacitor Ci has the same function as the smoothing capacitor Cout in FIG. 24. The inductor Lpc of the choke coil PCC and the fast switching diode D20 have the same function as the inductor L and the fast switching diode D, respectively, shown in FIG. 24. In addition, an RC snubber circuit formed by a capacitor Csn and a resistance Rsn connected in series with each other is connected in parallel with the fast switching diode D20 in FIG. 26.

A switching element Q103 corresponds to the switching element Q in FIG. 24. A power factor and output voltage controlling IC 120 in this case is an integrated circuit (IC) that controls operation of the active filter for improving a power factor so as to approximate the power factor to one. The power factor and output voltage controlling IC 120 includes for example a multiplier, a divider, an error voltage amplifier, a PWM control circuit, and a drive circuit for outputting a drive signal for driving the switching element Q103. A first feedback control circuit for setting a direct-current input voltage Ei at a predetermined value is formed by inputting a voltage obtained by dividing a voltage across the smoothing capacitor Ci (direct-current input voltage Ei) by a voltage dividing resistance R5 and a voltage dividing resistance R6 to a terminal T1 of the power factor and output voltage controlling IC 120.

In addition, a series connection of a voltage dividing resistance R101 and a voltage dividing resistance R102 is provided between the positive electrode output terminal of the primary side rectifying element Di and a primary side ground. A point of connection between the voltage dividing resistance R101 and the voltage dividing resistance R102 is connected to a terminal T5. Thereby a voltage rectified by the primary side rectifying element Di is divided and then input to the terminal T5. The voltage of a resistance 103, that is, a voltage corresponding to the source current of the switching element Q103 is input to a terminal T2. The source current of the switching element Q103 is a current contributing to storing of magnetic energy, in a current I101 flowing through the choke coil PCC. Then, a second feedback control circuit is formed which makes the signal corresponding to the rectified voltage which signal is input to the terminal T5 of the power factor and output voltage controlling IC 120 have a similar form to that of the signal corresponding to the envelope of the voltage input to the terminal T2 (that is, the envelope of the current I101).

In addition, a terminal T4 is supplied with operating power for the power factor and output voltage controlling IC 120. A half-wave rectifier circuit formed by a rectifier diode D11 and a series resonant capacitor C11 shown in FIG. 26 converts an alternating voltage induced in a winding N5, which is transformer-coupled with the inductor Lpc in the choke coil PCC, into a low direct-current voltage, and then supplies the low direct-current voltage to the terminal T4. In addition, the terminal T4 is connected to the positive electrode output terminal of the primary side rectifying element Di via a starting resistance Rs. During a start-up time before a voltage is induced in the winding N5 after turning on the commercial alternating-current power supply AC, the rectified output obtained at the positive electrode output terminal of the primary side rectifying element Di is supplied to the terminal T4 via the starting resistance Rs. The power factor and output voltage controlling IC 120 starts operation using the thus supplied rectified voltage as starting power.

A drive signal (gate voltage) for driving the switching element is output from a terminal T3 to the gate of the switching element Q103. That is, the drive signal for operating the two feedback control circuits, that is, the first feedback control circuit for making the value of the voltage divided by the above-mentioned voltage dividing resistances R5 and R6 a predetermined value and the second feedback control circuit for making the envelope of the current I101 have a similar form to that of the direct-current input voltage Ei is input to the gate of the switching element Q103. Thereby the waveform of an alternating input current IAC flowing in from the commercial alternating-current power supply AC is substantially the same as the waveform of the alternating input voltage VAC, so that the power factor is controlled to be substantially one. That is, the power factor is improved.

FIGS. 27A, 27B, and 27C and FIG. 28 show the waveforms of parts in power factor improving operation of the active filter shown in FIG. 26. FIGS. 27A, 27B, and 27C show the switching operation (on: conducting, and off: disconnecting operation) of the switching element Q103 and the current I101 flowing through the inductor Lpc of the choke coil PCC according to load variation. FIG. 27A shows operation under a light load. FIG. 27B shows operation under a medium load. FIG. 27C shows operation under a heavy load. As is understood from comparison between FIG. 27A, FIG. 27B, and FIG. 27C, the switching cycle of the switching element Q103 is held constant, while the on period of the switching element Q103 is lengthened as the load becomes heavier. The current I101 flowing into the smoothing capacitor Ci via the inductor Lpc is thus adjusted according to the load condition, whereby the direct-current input voltage Ei is stabilized irrespective of voltage variation of the alternating input voltage VAC and load variation. For example, the value of the direct-current input voltage Ei is held constant at 380 V while the value of the alternating input voltage VAC is in a range of 85 V to 264 V. The direct-current input voltage Ei is a voltage across the smoothing capacitor Ci, and is a direct-current input voltage for the current resonant converter in the following stage.

FIG. 28 shows the waveforms of the alternating input current IAC and the direct-current input voltage Ei for comparison with the alternating input voltage VAC. Incidentally, this figure shows results of an experiment when the value of the alternating input voltage VAC is 100 V. As shown in this figure, the waveform of the alternating input voltage VAC and the waveform of the alternating input current IAC are substantially similar to each other with the passage of time. That is, the power factor is improved. In addition to such an improvement in power factor, it is shown that the direct-current input voltage Ei is stabilized at an average value of 380 V. Also, as shown in FIG. 28, the direct-current input voltage Ei has ripple variations of 10 Vp-p at 380 V.

Returning to FIG. 26, description will be made of the current resonant converter in the stage following the active filter. The current resonant converter is supplied with the direct-current input voltage Ei and performs switching operation for power conversion. The current resonant converter has a switching circuit formed with switching elements Q101 and Q102 connected by a half-bridge connection. The current resonant converter in this case is externally excited. MOS-FETs are used as the switching element Q101 and the switching element Q102. A body diode DD101 and a body diode DD102 are respectively connected in parallel with these MOS-FETS. An oscillating and driving circuit 102 switching-drives the switching element Q101 and the switching element Q102 at a required switching frequency in timing in which the switching element Q101 and the switching element Q102 are alternately turned on/off. The oscillating and driving circuit 102 is controlled by a signal from a control circuit 101. The control circuit 101 operates so as to variably control the switching frequency according to the level of a secondary side direct-current output voltage Eo. Thereby the secondary side direct-current output voltage Eo is stabilized.

A converter transformer PIT is provided to transmit the switching output of the switching element Q101 and the switching element Q102 from a primary side to a secondary side. One terminal part of a primary winding N1 of the converter transformer PIT is connected to a point of connection between the switching element Q101 and the switching element Q102 (switching output point) via a primary side series resonant capacitor C101. Another terminal part of the primary winding N1 is connected to the primary side ground. The primary side series resonant capacitor C101 and a primary side leakage inductance L1 form a series resonant circuit. The series resonant circuit performs a resonant operation by being supplied with the switching output by the switching element Q101 and the switching element Q102.

A secondary winding N2 is wound on the secondary side of the converter transformer PIT. The secondary winding N2 in this case has a secondary winding part N2A and a secondary winding part N2B provided with a center tap as shown in FIG. 26. The center tap is connected to a secondary side ground. The secondary winding part N2A and the secondary winding part N2B are connected to the anodes of a rectifier diode Do1 and a rectifier diode Do2, respectively. The cathodes of the rectifier diode Do1 and the rectifier diode Do2 are each connected to a smoothing capacitor Co. Thus a double-wave rectifier circuit is formed. Thereby the secondary side direct-current output voltage Eo is obtained as voltage across the smoothing capacitor Co. This secondary side direct-current output voltage Eo is supplied to a load side not shown in the figure and also input to the above-mentioned control circuit 101.

FIG. 29 shows characteristics of power conversion efficiency ηAC→DC (overall efficiency) from AC power to DC power, the power factor PF, and the direct-current input voltage Ei with respect to load variation. FIG. 29 shows the characteristics when the value of the alternating input voltage VAC is 100 V and the value of load power Po is varied from 300 W to 0 W. FIG. 30 shows characteristics of the power conversion efficiency ηAC→DC (overall efficiency), the power factor PF, and the direct-current input voltage Ei with respect to variation in the alternating input voltage VAC. FIG. 30 shows the characteristics when the value of the alternating input voltage VAC is varied from 85 V to 264 V under a load condition where the value of the load power Po is constant at 300 W.

First, as shown in FIG. 29, the power conversion efficiency (overall efficiency) is decreased as the load power Po is increased. With respect to variation in the alternating input voltage VAC, as shown in FIG. 30, the power conversion efficiency (overall efficiency) is increased as the level of the alternating input voltage VAC becomes higher under the same load condition. For example, results obtained show that under the load condition where the load power Po is 300 W, the power conversion efficiency (overall efficiency) is about 83.0% when the alternating input voltage VAC is 100 V, the power conversion efficiency (overall efficiency) is about 89.0% when the alternating input voltage VAC is 230 V, and the power conversion efficiency (overall efficiency) is about 80.0% when the alternating input voltage VAC is 85 V.

The power factor PF is substantially constant as the load power Po is varied, as shown in FIG. 29. As for characteristics of variation of the power factor PF in relation to variation in the alternating input voltage VAC, FIG. 30 shows that although the power factor PF is decreased as the alternating input voltage VAC is increased, the power factor PF may be considered to be substantially constant. For example, under the load condition where the load power Po is 300 W, the value of the power factor PF is about 0.96 when the alternating input voltage VAC is 100 V, and the value of the power factor PF is about 0.94 when the alternating input voltage VAC is 230 V.

As shown in FIG. 29 and FIG. 30, results obtained show that the direct-current input voltage Ei is substantially constant as the load power Po or the alternating input voltage VAC is varied.

SUMMARY OF THE INVENTION

As is understood from the description so far, the power supply circuit shown in FIG. 26 includes the formerly known active filter shown in FIG. 24, and such a configuration improves the power factor.

However, the power supply circuit of the configuration shown in FIG. 26 has the following problems. First, the power conversion efficiency of the power supply circuit shown in FIG. 26 is obtained by combining efficiency of conversion from AC power to DC power which efficiency corresponds to the active filter in the preceding stage and efficiency of conversion from DC power to DC power which efficiency corresponds to the current resonant converter in the succeeding stage. That is, the overall power conversion efficiency (overall efficiency) of the circuit shown in FIG. 26 is a value obtained by multiplying together the values of these power conversion efficiencies, and is thus a product of numbers that are each one or less. Therefore the overall efficiency is decreased.

In addition, the active filter circuit performs hard switching operation, and thus causes much noise. Therefore a strict noise suppressing measure is required. Thus, in the circuit shown in FIG. 26, the noise filter formed by two line filter transformers and three across capacitors is provided for the line of the commercial alternating-current power supply AC. In addition, the normal mode noise filter formed by connecting one inductor LN and two filter capacitors CN is provided to the rectified output line. Further, the RC snubber circuit is provided for the fast recovery type fast switching diode D20 for rectification. Thus, measures against noise using a large number of parts are required, resulting in increases in cost and mounting area of a board of the power supply circuit.

Further, while the switching frequency of the switching element Q103 operated by the power factor and output voltage controlling IC 120 as a general-purpose IC is fixed at 60 kHz, the switching frequency of the current resonant converter in the following stage is varied in a range of 80 kHz to 200 kHz. The switching timing (clocks) of the switching element Q103 and the current resonant converter are thus different from each other and independent of each other. Therefore, due to the switching operations of the switching element Q103 and the current resonant converter operating on the respective clocks, ground potentials interfere with each other and become unstable, and for example an abnormal oscillation tends to occur. This also invites for example problems of more difficult circuit design and degradation in reliability.

The part of the current resonant converter in the power supply circuit having the configuration shown in FIG. 26 has, as switching elements, the switching element Q101 and the switching element Q102 connected by a half-bridge connection. It is thus necessary to use two expensive switching elements, so that the cost of the device as a whole is increased.

A switching power supply circuit according to an embodiment of the present invention may include a rectifying and smoothing section for converting an alternating input voltage from an alternating-current power supply into a primary side direct-current voltage; a converter section for converting the primary side direct-current voltage from the rectifying and smoothing section into an alternating voltage and further converting the alternating voltage into a secondary side direct-current voltage; and a power factor improving section for improving a power factor. The rectifying and smoothing section may include a primary side rectifying element for rectifying the alternating input voltage and a smoothing capacitor for smoothing rectified output from the primary side rectifying element. The converter section may include a choke coil having one terminal connected to the smoothing capacitor; a converter transformer having a primary winding on a primary side, the primary winding being connected to another terminal of the choke coil, and a secondary winding on a secondary side, the secondary winding being magnetically loosely coupled with the primary winding; a switching element for switching the primary side direct-current voltage supplied via the primary winding of the converter transformer; an oscillating and driving circuit for on-off driving of the switching element; a control circuit for supplying the oscillating and driving circuit with a control signal to make a value of the secondary side direct-current voltage output by a secondary side rectifier circuit connected to the secondary winding of the converter transformer a predetermined value; a primary side series resonant capacitor having a predetermined capacitance, the primary side series resonant capacitor having one terminal connected to a point of connection between the choke coil and the primary winding, whereby the primary side series resonant capacitor is connected in series with one of the choke coil and the primary winding, the predetermined capacitance being set such that a primary side first series resonance frequency governed by an inductance of the choke coil and the predetermined capacitance is substantially twice a primary side second series resonance frequency governed by a leakage inductance occurring at the primary winding and the predetermined capacitance; and a primary side parallel resonant capacitor having a predetermined capacitance, the primary side parallel resonant capacitor being connected in parallel with the switching element, the predetermined capacitance being set such that a primary side parallel resonance frequency governed by the inductance of the choke coil, the leakage inductance occurring at the primary winding, and the predetermined capacitance is substantially twice the primary side first series resonance frequency. The power factor improving section may add and pass a current corresponding to a voltage generated in the primary side series resonant capacitor to the smoothing capacitor via the primary side rectifying element. Thereby the power factor of the switching power supply circuit as a load for the alternating-current power supply is improved.

The power factor improving section of the switching power supply circuit may have an inductor connected between the primary side rectifying element and the smoothing capacitor, and another terminal of the primary side series resonant capacitor is connected to a point of connection between the inductor and the primary side rectifying element.

The choke coil may be used as the inductor of the power factor improving section, whereby the number of parts is reduced.

The choke coil may be formed as a leakage inductance occurring at a primary winding of a choke transformer, the choke transformer being formed with the primary winding and a secondary winding magnetically loosely coupled with each other, and the current corresponding to the voltage generated in the primary side series resonant capacitor flows via the secondary winding of the choke transformer. Thereby the power factor of the switching power supply circuit as a load for the alternating-current power supply is improved.

The switching power supply circuit according to one embodiment of the present invention can be provided with a power factor improving function without the active filter. By omitting the active filter, the power conversion efficiency characteristics of the switching power supply circuit are improved. Then, a radiator and the like can be omitted or reduced in size. In addition, as compared with the configuration including the active filter, the number of parts is also reduced greatly. Further, only one switching element is used to deal with high power, so that the circuit is reduced in size, weight, and cost. In addition, while the active filter performs hard switching operation, the switching converter according to one embodiment of the present invention, which is based on a resonant converter, performs soft switching operation. This greatly reduces switching noise, and thus contributes to reductions in size, weight, and cost of a noise filter. Further, because a plurality of clocks of different frequencies do not exist, a problem of mutual interference due to the plurality of clock frequencies does not occur, reliability is improved, and circuit board pattern design and the like are made easier. Further, the withstand voltage of the switching element can be lowered.

DETAILED DESCRIPTION

Prior to description of the best mode for carrying out the present invention (hereinafter referred to as an embodiment), a fundamental configuration of a switching converter that performs a switching operation of a class E resonance type (hereinafter referred to also as a class E switching converter) will first be described with reference to FIG. 22 and FIG. 23.

Figure 22:
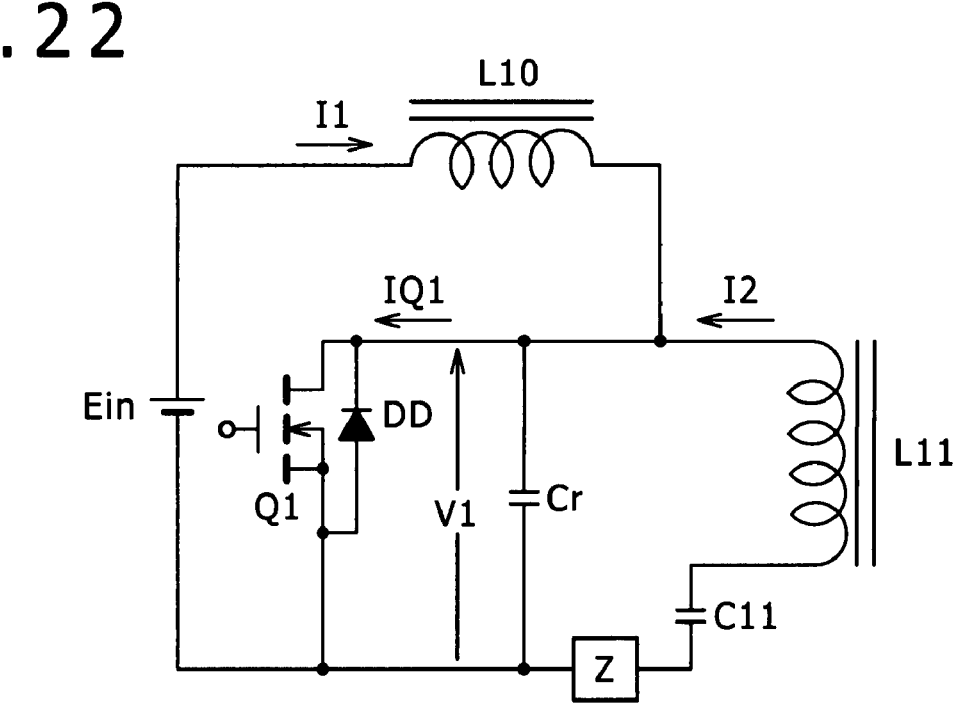
FIG. 22 is a diagram representing fundamental principles of a class E switching converter.

FIG. 22 shows the fundamental configuration of the class E switching converter. The class E switching converter shown in FIG. 22 employs a configuration of a DC-to-AC inverter operating as a class E resonance type.

The class E switching converter shown in FIG. 22 has a switching element Q1. The switching element Q1 in this case is a MOS-FET, for example. A body diode DD is formed in such a manner as to be connected in parallel with the drain and source of the switching element Q1 as the MOS-FET. A primary side parallel resonant capacitor Cr is connected in parallel with the same drain and source of the switching element Q1.

The drain of the switching element Q1 is connected to the positive electrode of a direct-current input voltage Ein via a series connection of a choke coil L10. The source of the switching element Q1 is connected to the negative electrode of the direct-current input voltage Ein. In addition, the drain of the switching element Q1 is connected with one terminal of a choke coil L11. A series resonant capacitor C11 is connected in series with another terminal of the choke coil L11. An impedance Z as a load is inserted between the series resonant capacitor C11 and the negative electrode of the direct-current input voltage Ein. The impedance Z in this case is obtained by converting a load on a secondary side to a load on a primary side.

The class E switching converter having such a configuration can be considered to be one form of a complex resonant converter having a parallel resonant circuit formed by the inductance of the choke coil L10 and the capacitance of the primary side parallel resonant capacitor Cr and a series resonant circuit formed by the inductance of the choke coil L11 and the capacitance of the series resonant capacitor C11. Also, the class E switching converter having such a configuration can be said to be the same as a voltage resonant converter of a single-ended type in that the switching converter has only one switching element.

Figure 23:
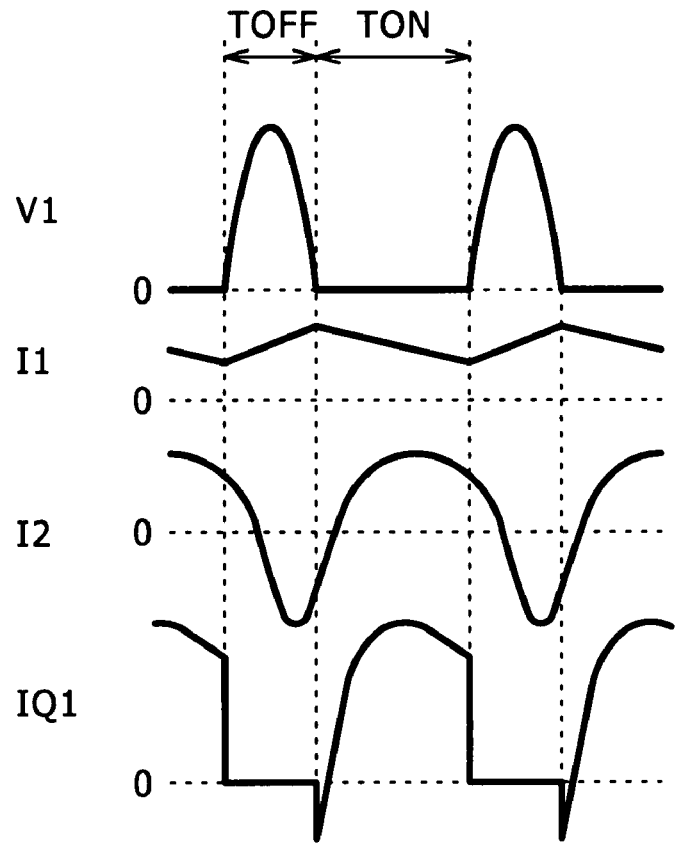
FIG. 23 is a waveform chart based on operating principles of the class E switching converter.
Figure 24:
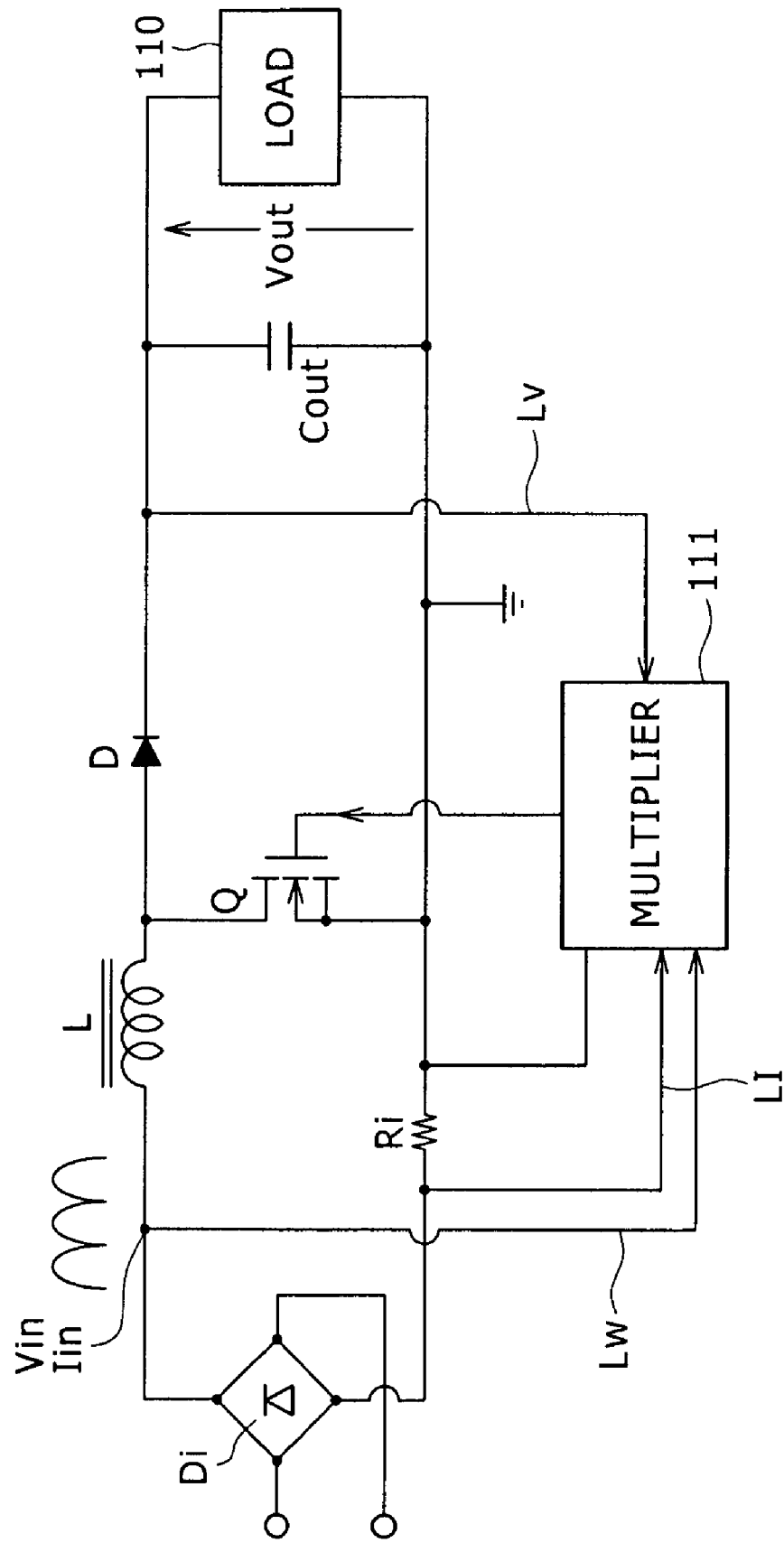
FIG. 24 is a diagram of a configuration of an active filter shown in the background art.
Figure 25:
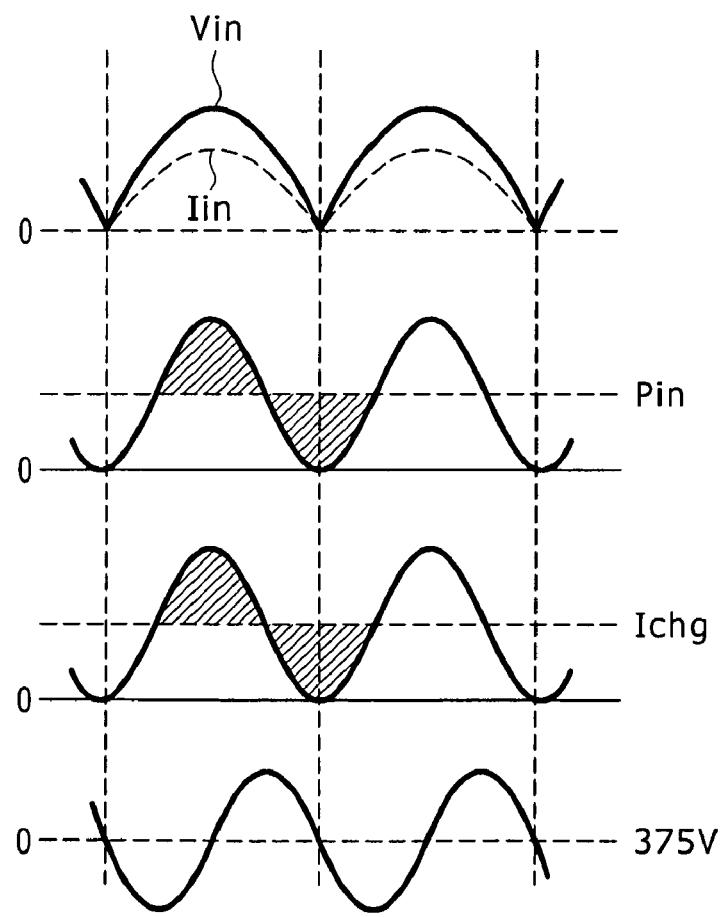
FIGS. 25A, 25B, 25C, and 25D are waveform charts of assistance in explaining the operation of the active filter shown in the related art.

FIG. 23 shows operation of principal parts of the class E switching converter having the configuration shown in FIG. 22.

A switching voltage V1 is obtained across the switching element Q1. The switching voltage V1 is at a zero level during an on period TON during which the switching element Q1 is on, and forms a sinusoidal pulse waveform during an off period TOFF during which the switching element Q1 is off. This switching pulse waveform is obtained by the voltage resonant operation of the above parallel resonant circuit.

A switching current IQ1 flows through the switching element Q1 and the body diode DD. The switching current IQ1 is at a zero level during the period TOFF. For a certain period from a start of the on period TON, the switching current IQ1 first flows through the body diode DD, and is therefore of negative polarity. Then the switching current IQ1 is inverted to be of positive polarity, and flows from the drain to the source of the switching element Q1.

A current I2 flowing through the above-described series resonant circuit as output of the class E switching converter is obtained by combining the switching current IQ1 flowing through the switching element Q1 and the body diode DD and a current flowing through the primary side parallel resonant capacitor Cr. The current I2 has a waveform including a sinusoidal wave component.

A relation between the switching current IQ1 and the switching voltage V1 indicates that ZVS operation is obtained in timing of turning off the switching element Q1, and that ZVS operation and ZCS operation are obtained in timing of turning on the switching element Q1.

Since the inductance of the choke coil L10 is set higher than the inductance of the choke coil L11, a current I1 flowing into the class E switching converter so as to flow from the positive electrode terminal of the direct-current input voltage Ein through the choke coil L10 forms a pulsating current waveform having a predetermined average level as shown in FIG. 23. Such a pulsating current waveform can be considered to be approximate to a direct current.

With the fact as a starting point that since the inductance of the choke coil L10 is set higher than the inductance of the choke coil L11, a stable ZVS operation is obtained in timing of turning off the switching element Q1, and stable ZVS and ZCS operations are obtained in timing of turning on the switching element Q1, as described above, in order to reduce device size and price, the inventor listed in the present application (hereinafter abbreviated as the present inventor) created a modified circuit of a class E switching converter in which circuit the inductance of the choke coil L10 is reduced, and obtained a circuit configuration in which stable ZVS operation can be performed in timings of turning off and turning on the switching element Q1.

Specifically, a converter part according to the creation of the present inventor has a voltage resonant circuit and two current resonant circuits on the primary side. One of the current resonant circuits is a primary side first series resonant circuit whose primary side first series resonance frequency is governed by the inductance of a choke coil and a primary side series resonant capacitor, and the other is a primary side second series resonant circuit whose primary side second series resonance frequency is governed by a leakage inductance occurring at the primary winding of a converter transformer and the primary side series resonant capacitor. The primary side first series resonance frequency is set at substantially twice the primary side second series resonance frequency. Thereby excellent stable ZVS operation is obtained even when the value of the inductance of the choke coil is low.

Further, the present inventor combined a power factor improving part with the converter part, and thereby achieved a switching power supply circuit also exhibiting an excellent power factor improving characteristic. Specifically, the power factor improving part may be configured to pass a part of resonance current flowing though the primary side first series resonant circuit and a part of resonance current flowing though the primary side second series resonant circuit from an alternating-current power supply via a primary side rectifying element, or may pass a current corresponding to a voltage generated in the primary side series resonant capacitor from the alternating-current power supply via the primary side rectifying element. Concrete circuit configurations of these parts will hereinafter be described as embodiments.

First Embodiment

As the present embodiment, a modification of the above-described class E switching converter is applied to a power supply circuit. An outline of a switching power supply circuit according to a first embodiment shown in FIG. 1 will be described in the following. The switching power supply circuit according to the first embodiment includes: a rectifying and smoothing section for converting input alternating-current power from an alternating-current power supply AC into primary side direct-current power; a converter section for converting the primary side direct-current power from the rectifying and smoothing section into alternating-current power and further converting the alternating-current power into secondary side direct-current power; and a power factor improving section for improving a power factor. The rectifying and smoothing section includes a primary side rectifying element Di, which is supplied with the input alternating-current power from the alternating-current power supply AC and rectifies the input alternating-current power, and a smoothing capacitor Ci. The converter section includes: a choke coil PCC supplied with the primary side direct-current power from the smoothing capacitor Ci; a converter transformer PIT having a primary winding N1 supplied with the power from the choke coil PCC and a secondary winding N2 magnetically loosely coupled with the primary winding N1; a switching element Q1 for supplying the alternating-current power to the primary winding N1; an oscillating and driving circuit 2 for on-off driving of the switching element Q1; a control circuit 1 for supplying the oscillating and driving circuit 2 with a control signal to make the value of a secondary side direct-current output voltage Eo output by a secondary side rectifying element Do and a smoothing capacitor Co forming a secondary side rectifier circuit connected to the secondary winding N2 a predetermined value; a primary side first series resonant circuit whose primary side first series resonance frequency is governed by an inductance L3 possessed by the choke coil PCC and a primary side series resonant capacitor C2; and a primary side second series resonant circuit whose primary side second series resonance frequency is governed by a leakage inductance L1 occurring at the primary winding N1 and the primary side series resonant capacitor C2, the primary side first series resonance frequency being set at substantially twice the primary side second series resonance frequency. The power factor improving section is formed such that a current I3 as resonance current flowing through the primary side first series resonant circuit and the primary side second series resonant circuit flows from the alternating-current power supply via the primary side rectifying element Di. In order to thus pass the current I3 from the alternating-current power supply, the above primary side rectifying element Di is formed by a fast rectifying element, and a power factor improving inductor Lo is provided. An outline of the rectifying and smoothing section, an outline of the converter section, an outline of the power factor improving section, and an outline of the secondary side rectifier circuit will be described in order in the following.

The rectifying and smoothing section is formed with the primary side rectifying element Di, which is supplied with the input alternating-current power from the alternating-current power supply AC and rectifies the input alternating-current power, and the smoothing capacitor Ci. The input alternating-current power from the alternating-current power supply AC is input to the input side of the primary side rectifying element Di, and one terminal of the output side of the primary side rectifying element Di is connected to the smoothing capacitor Ci, whereby the primary side direct-current power is generated.

While the primary side has the configuration of a voltage and current resonant converter performing class E switching operation, the primary side has different connections from those of the class E switching converter shown in FIG. 22. Specifically, while the class E switching converter shown in FIG. 22 supplies direct-current power from a point of connection between the choke coil L10 and the choke coil L11 to the switching element Q1, the converter according to the present embodiment supplies direct-current power from a series connection circuit of the choke coil PCC corresponding to the choke coil L10 and the leakage inductance L1 occurring at the primary winding N1 corresponding to the choke coil L11 to the switching element Q1. Thus, while the converter according to the present embodiment has a different configuration from that of the class E converter, the converter according to the present embodiment can provide the effects of the class E converter in that the current input to the converter circuit is close to direct current and ZVS operation is obtained in timings of turning off and turning on the switching element Q1. The circuit configuration of the present embodiment will be referred to as a modified class E converter. Thus, the primary side has a current and voltage resonant circuit, and the secondary side has a current resonant circuit to be described later, whereby a multiple resonant converter section is formed.

More specifically, when viewed as a resonant converter, this multiple resonant converter section includes the choke coil PCC having one terminal connected to one terminal of the smoothing capacitor Ci and the converter transformer PIT wound with the primary winding N1 and the secondary winding N2 loosely coupled with each other, one terminal of the primary winding N1 being connected to another terminal of the choke coil PCC. Another terminal of the primary winding N1 of the converter transformer PIT (a simple abbreviation of the primary winding N1 will also be used hereinafter) is connected to one terminal of the switching element Q1, whereby alternating-current power is supplied to the converter transformer PIT. Then, the multiple resonant converter section includes: the primary side first series resonant circuit whose primary side first series resonance frequency as resonance frequency is governed by the inductance L3 possessed by the choke coil PCC and the capacitance of the primary side series resonant capacitor C2 connected to the other terminal of the choke coil PCC and the one terminal of the primary winding N1; the primary side second series resonant circuit whose primary side second series resonance frequency as resonance frequency is governed by the leakage inductance L1 occurring at the primary winding N1 and the capacitance of the primary side series resonant capacitor C2; and a primary side parallel resonant circuit whose resonance frequency is governed by the leakage inductance L1 occurring at the primary winding N1, the inductance L3 possessed by the choke coil PCC, and a primary side parallel resonant capacitor Cr connected in parallel with the switching element Q1.

In this case, a ratio of the primary side first series resonance frequency to the primary side second series resonance frequency is set at substantially 2:1. That is, when the primary side second series resonance frequency is a reference frequency, the primary side first series resonance frequency is set at substantially twice the primary side second series resonance frequency. When the primary side first series resonance frequency is a reference frequency, the primary side second series resonance frequency is set at substantially ½ of the primary side first series resonance frequency. The present inventor has found that this value is important in relation to the effect of ZVS operation in timings of turning off and turning on the switching element Q1, and that a load power variable range where ZVS operation is obtained is narrowed as the ratio of the primary side first series resonance frequency to the primary side second series resonance frequency deviates from the above-mentioned value. In this case, substantially twice a frequency and substantially ½ of a frequency include a range of 20 percent with twice the frequency and ½ of the frequency as a center. Incidentally, the frequency of the primary side parallel resonant circuit is substantially twice the primary side first series resonance frequency.

In addition, the multiple resonant converter section includes the oscillating and driving circuit 2 for on-off driving of the switching element Q1 and the control circuit 1 for supplying the oscillating and driving circuit 2 with a control signal to make the value of the secondary side direct-current output voltage Eo output by the secondary side rectifier circuit connected to the secondary winding N2 of the converter transformer PIT (a simple abbreviation of the secondary winding N2 will also be used hereinafter) a predetermined value. The secondary side rectifier circuit connected to the secondary winding N2 has a secondary side series resonant capacitor C4 to form a secondary side series resonant circuit.

The control circuit 1 supplies the oscillating and driving circuit 2 with a detection output corresponding to a difference between the input secondary side direct-current output voltage Eo and a predetermined reference voltage value. The oscillating and driving circuit 2 drives the switching element Q1 so as to mainly change switching frequency according to the input detection output of the control circuit 1. In addition to the switching frequency, the oscillating and driving circuit 2 may change a time ratio as a ratio of the on period of the switching element Q1 in one cycle.

Thus variably controlling the switching frequency of the switching element Q1 changes the resonant impedance of the primary side and the secondary side in the power supply circuit, and changes an amount of power transmitted from the primary winding N1 to the secondary winding N2 side of the converter transformer PIT and an amount of power to be supplied from the secondary side rectifier circuit to the load. Thereby an operation of matching the magnitude of the secondary side direct-current output voltage Eo with the reference voltage is obtained. That is, the secondary side direct-current output voltage Eo is stabilized.

Further, the switching power supply circuit according to the present embodiment has the power factor improving section. The power factor improving section includes: the primary side rectifying element Di functioning as a rectifying element for making the current I3 as a current obtained by adding together the resonance currents flowing through the primary side first series resonant circuit and the primary side second series resonant circuit flow in one direction from the alternating-current power supply to the smoothing capacitor Ci; and the power factor improving inductor Lo.

One terminal of the power factor improving inductor Lo is connected to one terminal of the output side of the primary side rectifying element Di and the primary side series resonant capacitor C2. Another terminal of the power factor improving inductor Lo is connected to the smoothing capacitor Ci.

In addition, a filter capacitor CN is connected to the input side of the primary side rectifying element Di. This filter capacitor CN is to suppress normal mode noise, thereby making it possible to prevent a radiation component occurring according to the switching of the switching element Q1 from flowing out to the alternating-current power supply AC side.

The secondary side rectifier circuit of the switching power supply circuit according to the present embodiment is formed as a full-wave rectifier circuit by connecting the secondary side rectifying element Do operating at high speed and the smoothing capacitor Co to the secondary winding N2 with which the secondary side series resonant capacitor C4 is connected in series. That is, a positive current and a negative current flow through the secondary side series resonant capacitor C4 in a switching cycle, and the secondary side series resonant capacitor C4 functions as a part of the resonant circuit without being charged with a charge of either polarity. That is, the secondary side rectifier circuit forms a secondary side series resonant circuit whose series resonance frequency is governed by the leakage inductance L2 of the secondary winding N2 and the secondary side series resonant capacitor C4. Incidentally, the secondary side rectifier circuit may be not only a rectifier circuit generating a voltage once the voltage generated in the secondary winding N2 but also a voltage doubler rectifier circuit generating a voltage twice the voltage generated in the secondary winding N2. Further, as for the secondary side resonant circuit, not only may a series resonant circuit be formed to make a multiple converter, but also a partial voltage resonant circuit or a parallel resonant circuit may be formed to make a multiple converter. Further, only a secondary side rectifier circuit may be provided without a resonant circuit being formed on the secondary side. The various examples of modification of these secondary side rectifier circuits will be described later.

Figure 1:
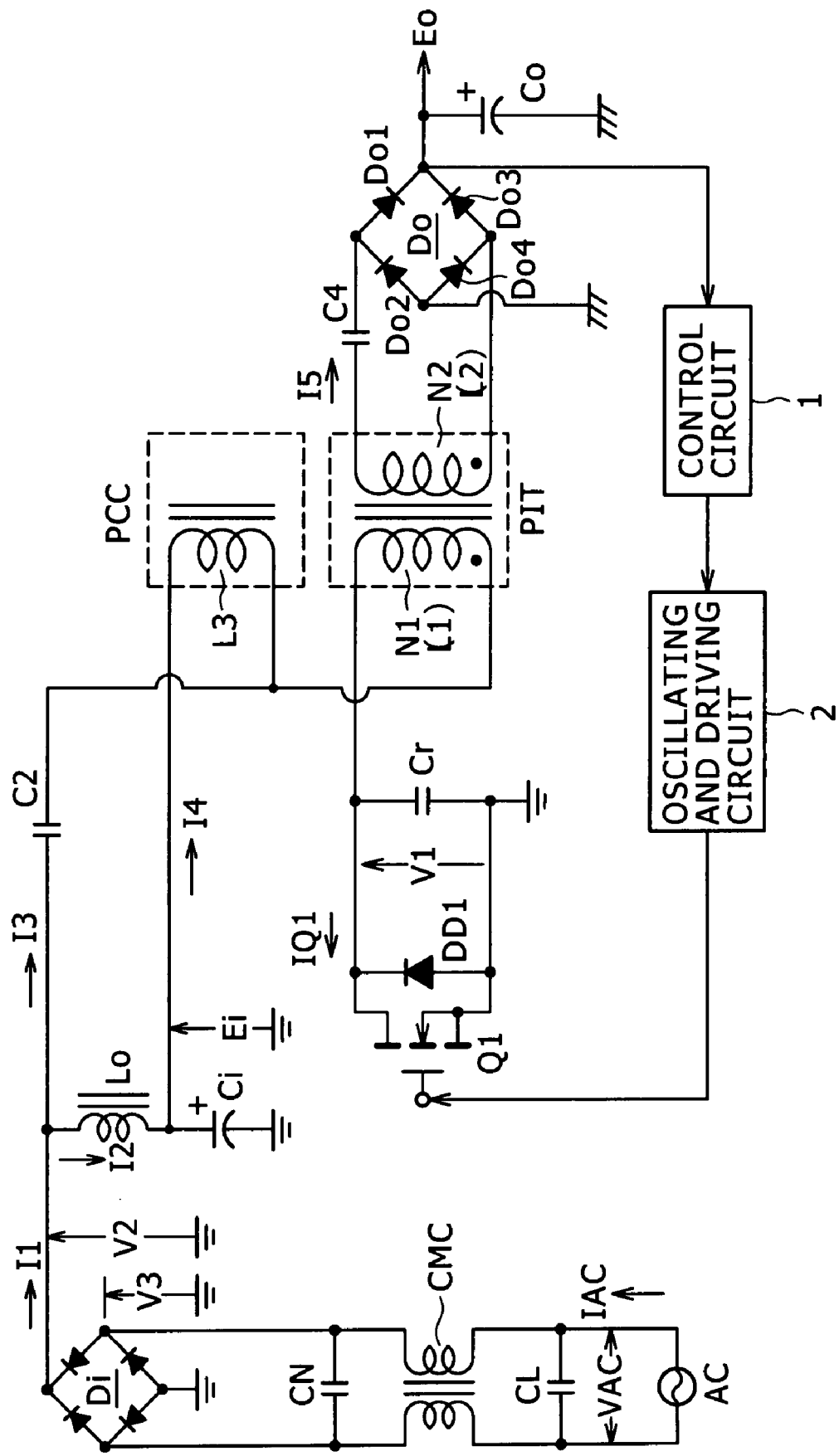
FIG. 1 is a circuit diagram showing an example of configuration of a power supply circuit according to an embodiment.

The switching power supply circuit according to the embodiment shown in FIG. 1 will next be described below in more detail in order from the side of the commercial alternating-current power supply AC, centering on the action of the switching power supply circuit. The two-phase input line of the commercial alternating-current power supply AC is connected to the primary side rectifying element Di via a common mode noise filter composed of a common mode choke coil CMC, an across capacitor CL, and the filter capacitor CN. The common mode noise filter has a function of eliminating common mode noise caused between the line of the commercial alternating-current power supply AC and the secondary side of the switching power supply circuit. Incidentally, the filter capacitor CN not only functions as a common mode noise filter but also functions as a normal mode filter in the present embodiment, as described above.

Commercial alternating-current power having a frequency of 50 or 60 Hz which power is passed through the common mode noise filter is supplied to the input side of the primary side rectifying element Di formed by bridge connection of four fast type rectifying elements (diodes), and then rectified by the primary side rectifying element Di, whereby a pulsating voltage is generated. The pulsating voltage is applied to the smoothing capacitor Ci via the power factor improving inductor Lo. A direct-current input voltage Ei as direct-current voltage having a voltage value around the peak value of the pulsating voltage is maintained across the smoothing capacitor Ci. A reason for forming the primary side rectifying element Di by the bridge connection of the fast type rectifying elements (diodes) is circuit simplification by making the primary side rectifying element Di also function as a rectifying element for passing the resonance currents having a frequency of a few ten KHz to 200 KHz and flowing through the primary side first series resonant circuit and the primary side second series resonant circuit in one direction and form a part of the power factor improving section. That is, the power factor improving section passes a component in one direction as part of the resonance currents flowing in both directions from the commercial alternating-current power supply AC via the primary side rectifying element Di, and thereby improves the power factor.

The direct-current input voltage Ei has a level corresponding to once an alternating input voltage VAC. The direct-current input voltage Ei is a direct-current input voltage for the class E switching converter in a subsequent stage.

The multiple resonant converter section functions as modified class E switching converter in substantially the same manner as the class E switching converter. The multiple resonant converter section is formed with the choke coil PCC, the converter transformer PIT, the primary side series resonant capacitor C2, the primary side parallel resonant capacitor Cr, and the switching element Q1 as main parts. Correspondences between parts of the class E switching converter whose principles have been described with reference to FIG. 22 and parts in FIG. 1 are as follows. The choke coil L10 corresponds to the choke coil PCC; the choke coil L11 corresponds to the leakage inductance L1 occurring at the primary winding N1 of the converter transformer PIT; the primary side series resonant capacitor C11 corresponds to the primary side series resonant capacitor C2; the primary side parallel resonant capacitor Cr corresponds to the primary side parallel resonant capacitor Cr; the switching element Q1 corresponds to the switching element Q1; and the impedance Z as a load corresponds to an impedance obtained by converting an impedance on the secondary side to the primary side.

That is, in the first embodiment shown in FIG. 1, the modified class E switching converter is formed as follows. One terminal (one end) of the choke coil PCC is connected to one terminal of the smoothing capacitor Ci. Another terminal (another end) of the choke coil PCC is connected to one terminal of the primary winding N1 of the converter transformer PIT and the primary side series resonant capacitor C2. Another terminal of the primary winding N1 of the converter transformer PIT is connected to one terminal of the switching element Q1. In addition, the primary side parallel resonant capacitor Cr is connected in parallel with the switching element Q1. Even when such a configuration is employed, a current I1 is a pulsating current, alternating current is not supplied from the smoothing capacitor Ci, and thus a benefit of reducing a load on the smoothing capacitor Ci can be gained.

The primary winding N1 and the secondary winding N2 of the converter transformer PIT are loosely coupled with each other at a coupling coefficient of 0.82. Therefore the primary winding N1 has the leakage inductance L1. The primary side first series resonant circuit whose primary side first series resonance frequency is governed by the inductance L3 of the choke coil PCC and the capacitance of the primary side series resonant capacitor C2 is formed. In addition, the primary side second series resonant circuit whose primary side second series resonance frequency is governed by the leakage inductance L1 and the capacitance of the primary side series resonant capacitor C2 is formed. In addition, the primary side parallel resonant circuit whose primary side parallel resonance frequency is governed by the leakage inductance L1, the inductance L3 of the choke coil PCC, and the capacitance of the primary side parallel resonant capacitor Cr is formed.

The resonance frequency being "governed" means that the resonance frequency is determined mainly by these elements. For example, although the primary side first series resonance frequency, the primary side second series resonance frequency, and the primary side parallel resonance frequency are affected by the inductance component of the power factor improving inductor Lo, the smoothing capacitor Ci, and the like, the inductance component of the power factor improving inductor Lo, the smoothing capacitor Ci, and the like produce less effect on the primary side series resonance frequencies and the primary side parallel resonance frequency.

Specifically, the primary side first series resonant circuit forms a current path in one direction from a ground point of the primary side rectifying element Di through anodes and cathodes of each of two sets of two fast rectifying elements connected in series with each other to the primary side series resonant capacitor C2 to the choke coil PCC to the smoothing capacitor Ci. The primary side first series resonant circuit forms a current path in another direction from the primary side series resonant capacitor C2 to the power factor improving inductor to the choke coil PCC. The primary side second series resonant circuit forms a current path in one direction from the ground point of the primary side rectifying element Di through the anodes and cathodes of each of the two sets of two fast rectifying elements connected in series with each other to the primary side series resonant capacitor C2 to the primary winding N1 and then from the drain to the source of the switching element Q1. The primary side second series resonant circuit forms a current path in another direction from the primary side series resonant capacitor C2 to the power factor improving inductor to the smoothing capacitor Ci to a body diode DD1 to the primary winding N1.

In addition, as described above, the secondary winding N2 of the converter transformer is connected to the secondary side series resonant capacitor C4. The secondary side series resonant circuit whose resonance frequency is governed by the leakage inductance component (represented by the inductance L2 in FIG. 1) of the secondary side and the capacitance of the secondary side series resonant capacitor C4 is formed. Incidentally, in the present embodiment, the secondary side rectifier circuit is formed as a full-wave rectifier circuit. However, in addition to the full-wave rectifier circuit, the secondary side rectifier circuit may be formed as a voltage doubler half-wave rectifier circuit or a voltage doubler full-wave rectifier circuit to be described later. Further, the secondary side may use not only a secondary side series resonant circuit but also a partial resonant circuit. Incidentally, fast diodes that are ready for high-frequency current flowing through the secondary side winding N2 and have excellent high-frequency switching characteristics are employed as diodes used in the various rectifier circuits on the secondary side. The partial resonant circuit uses a small-capacitance capacitor so as to resonate only in timing of turning on and off the diode of the secondary side rectifier circuit.

The switching element Q1 supplying alternating-current power to the primary side series resonant circuits and the primary side parallel resonant circuit is connected to the other terminal of the primary winding N1. In this case, the oscillating and driving circuit 2 drives the switching element Q1. Thus, the primary side operates as a converter performing modified class E switching operation and has the configuration of a voltage and current resonant converter, and the secondary side has a current resonant converter, whereby, as a whole, a multiple resonant converter that holds the value of secondary side direct-current output voltage Eo constant is formed. That is, the switching power supply circuit according to the present embodiment has the multiple resonant converter section including the primary side series resonant circuits, the primary side parallel resonant circuit, and the secondary side series resonant circuit, as viewed in terms of alternating current.

The action of the power factor improving section will next be described. A power factor improving effect is produced by connecting the power factor improving inductor Lo and the primary side rectifying element Di to the primary side series resonant capacitor C2. The resonance current flowing through the primary side first series resonant circuit and the primary side second series resonant circuit flows through the primary side series resonant capacitor C2. A current in one direction of the current I3 as the resonance current flowing through the primary side series resonant capacitor C2 flows from the alternating-current power supply AC via the cathodes of two rectifying elements forming the primary side rectifying element Di, is added to rectified current, and then flows as current I1. In this case, the power factor improving inductor Lo having a high impedance for this resonance current prevents resonance current from flowing from the smoothing capacitor Ci to the primary side series resonant capacitor C2.

A current in another direction of the current I3 cannot flow through the cathodes of the two rectifying elements forming the primary side rectifying element Di, but is added, as current I2 flowing to the smoothing capacitor Ci, to the current from the primary side rectifying element Di. As described above, in order to have an effect of changing a path through which the current I3 passes according to the flowing direction of the current, the primary side rectifying element Di needs to be formed by a fast rectifying element having a sufficient switching capability for a component having the cycle of the current I3 as the resonance current flowing through the primary side first series resonant circuit and the primary side second series resonant circuit and a harmonic having an integral multiple of the cycle. Otherwise, there occur not only an increase in switching loss and a decrease in efficiency of the switching power supply circuit but also destruction of the primary side rectifying element Di due to heat loss in some cases.

Thus, the current in one direction as part of the resonance current included in the current I3 flows through the primary side rectifying element Di, whereby the flow angle of an alternating input current IAC is increased, and the power factor is improved. That is, when the primary side series resonant capacitor C2 is not connected to the primary side rectifying element Di, the current I1 has a waveform in the shape of a pulse flowing only around the peak of a voltage V2. However, the current in one direction included in the current I3 also flows outside the vicinity of the peak of the voltage V2, whereby the conduction angle is increased. Thus, in the present embodiment, the resonance current flowing through the primary side first series resonant circuit and the primary side second series resonant circuit is fed back to the smoothing capacitor Ci, and thereby a power regenerative type power factor improving section is formed.

Further, description will be made of concrete constitutions of details of important parts in the switching power supply circuit according to the embodiment shown in FIG. 1 and constants of parts with which results of FIG. 3 and FIG. 5 to be described later were obtained.

Details of the converter transformer PIT will first be described. The converter transformer PIT has functions of insulating the primary side and the secondary side from each other and performing voltage conversion. Further, the converter transformer PIT also functions as the inductance L1 forming a part of the resonant circuits for making the modified class E switching converter of the multiple resonant type function. The inductance L1 is the leakage inductance component formed by the converter transformer PIT. A concrete structure of the converter transformer PIT will be described with reference to FIG. 2, which is a sectional view of the converter transformer PIT.

The converter transformer PIT has an EE type core (EE-shaped core) formed by combining an E-type core CR1 and an E-type core CR2 of ferrite material with each other such that magnetic legs of the E-type core CR1 are opposed to magnetic legs of the E-type core CR2. A primary side winding part and a secondary side winding part are divided from each other so as to be independent of each other, and a bobbin B formed by a resin, for example, is provided. Then, the bobbin B thus wound with the primary winding N1 and the secondary winding N2 is attached to the EE-shaped core. Thereby the primary winding N1 and the secondary winding N2 are separated from each other in respective different winding regions and wound around the central magnetic leg of the EE-shaped core. The structure of the converter transformer PIT as a whole is thus obtained.

A gap G of 1.2 mm is formed in the central magnetic leg of the EE-shaped core. Thereby 0.82 is obtained as the value of a coupling coefficient k between the primary side and the secondary side. Thus, the leakage inductance L1 having a high inductance value is obtained. Incidentally, the gap G is formed by making the central magnetic legs of the E-type core CR1 and the E-type core CR2 shorter than the two outer magnetic legs of the E-type core CR1 and the E-type core CR2. The number of turns of the primary winding N1 is 45 T (turns). The number of turns of the secondary winding N2 is 30 T (turns). A core material is EER-35 (the name of the core material).

The value of the primary side parallel resonant capacitor Cr is 6800 μF. The value of the primary side series resonant capacitor C2 is 0.1 μF. The value of the secondary side series resonant capacitor C4 is 0.056 μF. The value of the filter capacitor CN is 1 μF.

Both the choke coil PCC and the power factor improving inductor Lo can employ substantially the same configuration as the converter transformer PIT. The value of the inductance L3 of the choke coil PCC is 82 μH. The value of the inductance of the power factor improving inductor Lo is 47 μH.

A rectifying element meeting 3 A/600 V specifications is used as the primary side rectifying element Di. A rectifying element meeting 5 A/200 V specifications is used as the secondary side rectifying element Do. Both are formed by a fast rectifying element.

On the secondary side of the converter transformer PIT, a voltage waveform similar to an alternating voltage induced by the primary winding N1 is generated in the secondary winding N2. The secondary side series resonant capacitor C4 is connected in series with the secondary winding N2. Thereby the secondary side series resonant circuit is formed by the leakage inductance L2 as viewed from the secondary winding N2 side and the secondary side series resonant capacitor C4. In the present embodiment, the resonance frequency of the secondary side series resonant circuit is set substantially equal to the primary side series resonance frequency governed by the primary side series resonant capacitor C2, the leakage inductance L1, and the inductance L3 of the choke coil PCC described above. However, the resonance frequency of the secondary side series resonant circuit can be set suitably in relation to the primary side series resonance frequency. Further, a partial voltage resonant circuit may be provided on the secondary side without the secondary side series resonant circuit being provided.

A MOS-FET is selected as the switching element Q1, as described above. The switching element Q1 includes the body diode DD1 in parallel with the source and drain of the switching element Q1.

The control circuit 1 supplies the oscillating and driving circuit 2 with a detection output corresponding to a difference between the input secondary side direct-current output voltage Eo and a predetermined reference voltage value. The oscillating and driving circuit 2 drives the switching element Q1 so as to mainly change switching frequency according to the input detection output of the control circuit 1. In addition to the switching frequency, the oscillating and driving circuit 2 may change a time ratio as a ratio of the on period of the switching element Q1 in one cycle.

Thus variably controlling the switching frequency of the switching element Q1 changes the resonant impedance of the primary side and the secondary side in the power supply circuit, and changes an amount of power transmitted from the primary winding N1 to the secondary winding N2 side of the converter transformer PIT and an amount of power to be supplied from the secondary side rectifier circuit to the load. Thereby an operation of matching the magnitude of the secondary side direct-current output voltage Eo with the reference voltage is obtained. That is, the secondary side direct-current output voltage Eo is stabilized. In this case, the value of the secondary side direct-current output voltage Eo is 175 V.

(Operating Waveforms of Principal Parts of First Embodiment and Measurement Data)

The configuration and action of the switching power supply circuit according to the present embodiment has been described above. FIG. 3 and FIG. 4 show operating waveforms of principal parts of the switching power supply circuit according to the present embodiment shown in FIG. 1. FIG. 5 shows measurement data.

Figure 3:
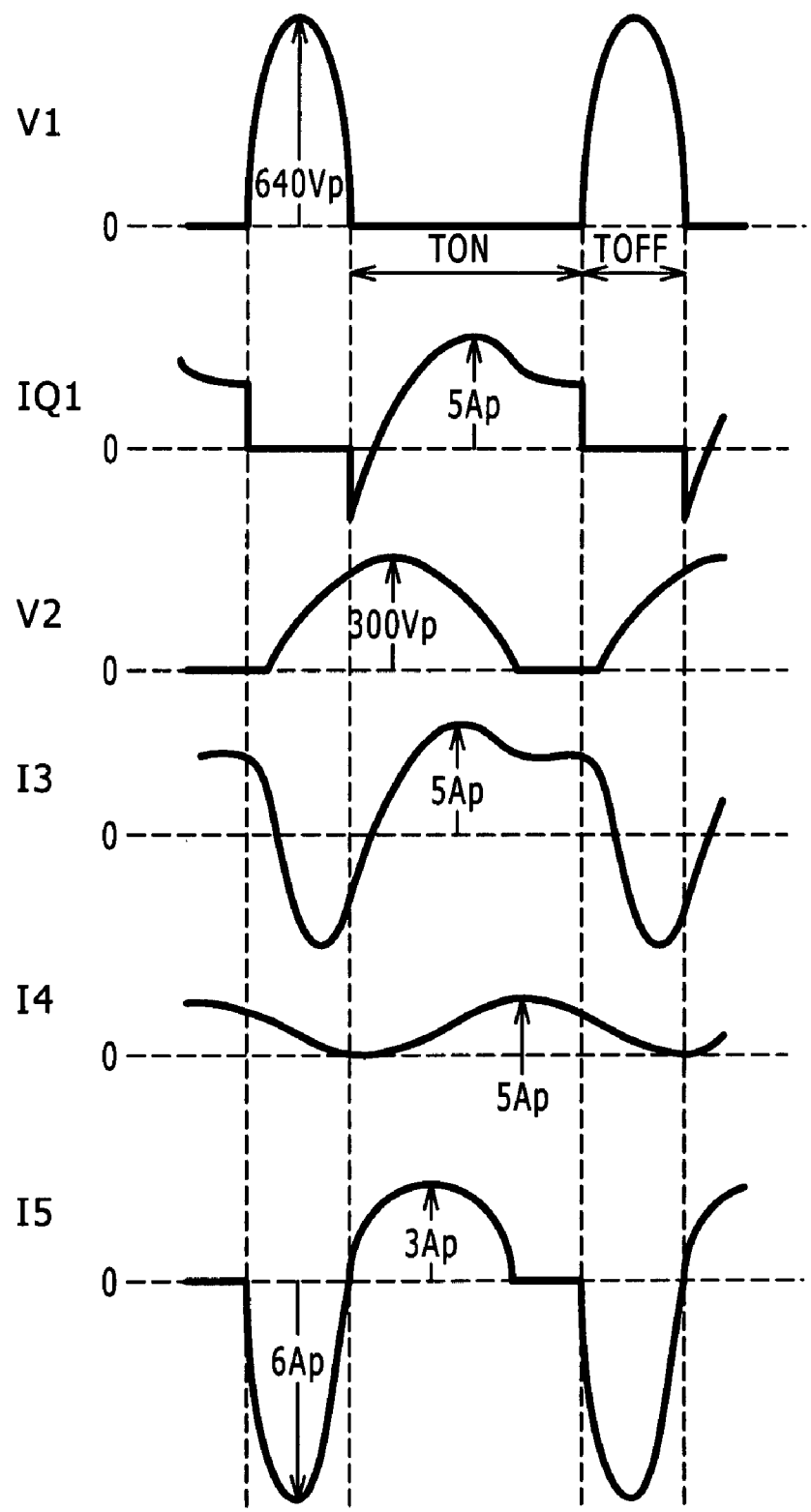
FIG. 3 is a waveform chart showing operation of principal parts in the power supply circuit according to the embodiment on the basis of switching cycles.
Figure 4:
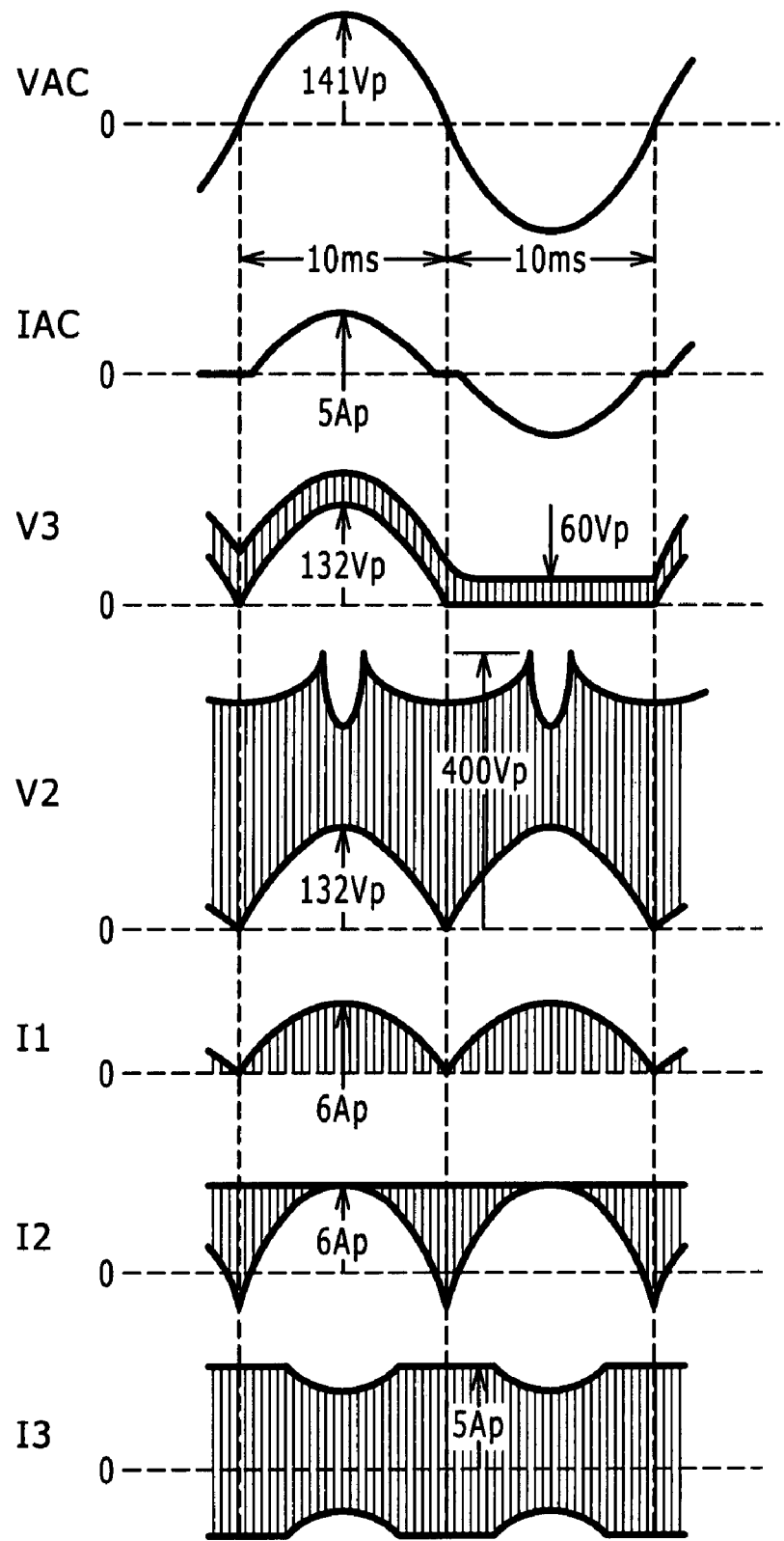
FIG. 4 is a waveform chart showing operation of principal parts in the power supply circuit according to the embodiment on the basis of cycles of alternating input voltage.

FIG. 3 shows operating waveforms of principal parts of the circuit when the alternating input voltage is 100 V and a maximum load power is 300 W on the basis of switching cycles. FIG. 3 shows, from a top to a bottom, a voltage V1, a current IQ1, a voltage V2, a current I3, a current I4, and a current I5.

FIG. 4 shows operating waveforms of principal parts when the alternating input voltage is 100 V and the maximum load power is 300 W on the basis of the cycles of the commercial alternating-current power supply. FIG. 4 shows, from a top to a bottom, the alternating input voltage VAC, the alternating input current IAC, a voltage V3, the voltage V2, the current I1, the current I2, and the current I3. Each of hatched parts of the voltage V3, the voltage V2, the current I1, the current I2, and the current I3 in FIG. 4 indicates that switching is performed.

Figure 5:
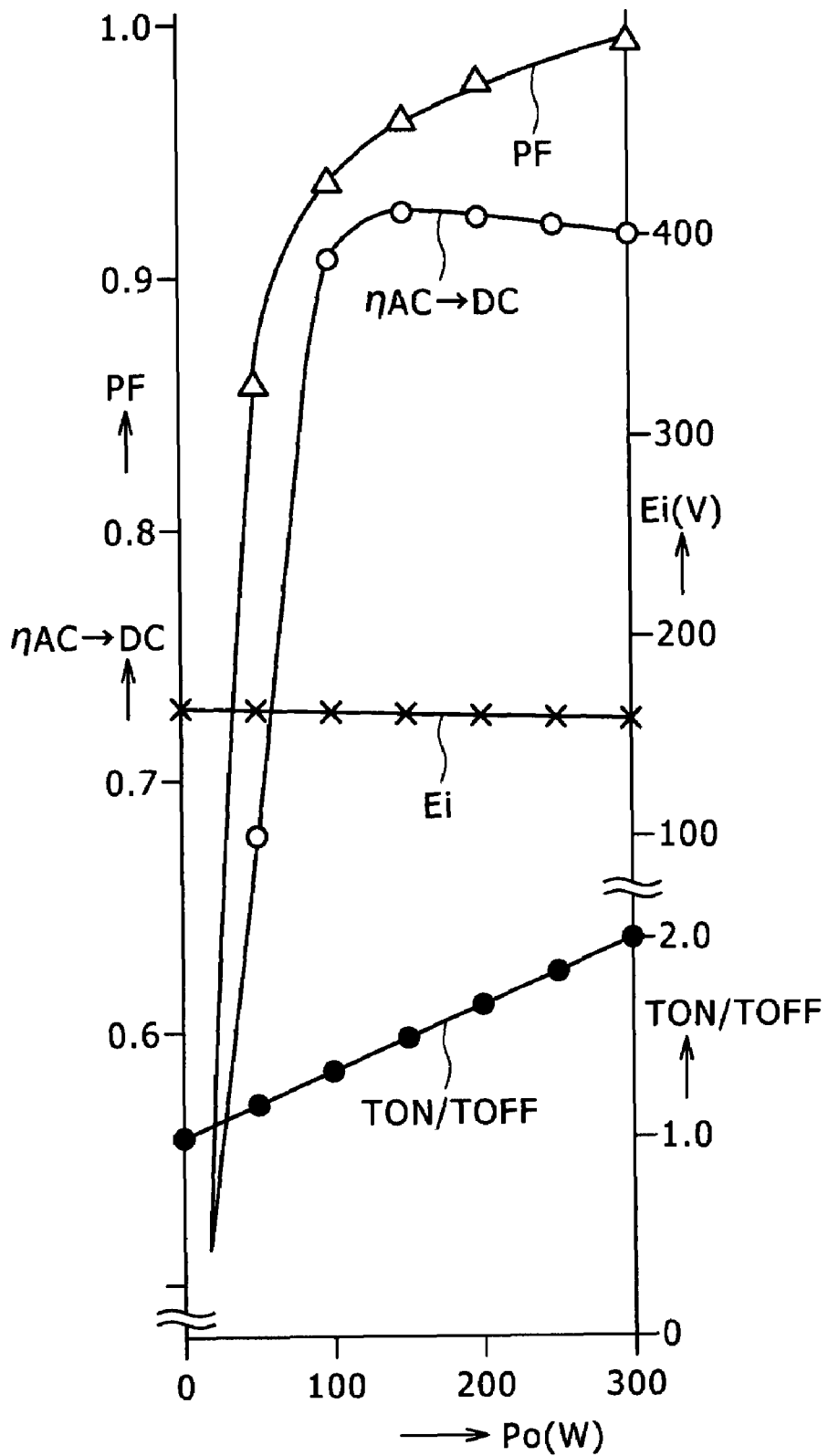
FIG. 5 is a diagram showing a rectified and smoothed voltage, a power factor, power conversion efficiency, and a ratio TON/TOFF with respect to load variation in the power supply circuit according to the embodiment.

FIG. 5 shows the direct-current input voltage Ei, the power factor PF, efficiency $\eta AC \rightarrow DC$ of power conversion from alternating-current input power to direct-current output power, and a ratio TON/TOFF between the on period TON and the off period TOFF of the switching element Q1 with respect to load variation in a range where the value of load power Po is 0 W, which represents no load, to 300 W under an input voltage condition where the value of the alternating input voltage VAC is 100 V.

Introducing a part of representative characteristics that can be read from FIG. 5, for example, the value of the power factor PF when the load power Po is 300 W is 0.933, and the value of the power factor PF when the load power Po is 50 W is 0.86, these values representing a high power factor. The power conversion efficiency $\eta AC \rightarrow DC$ when the load power Po is 300 W is high at 92.1%. In the range where the load power Po is 300 W to 0 W, the value of the direct-current input voltage Ei is 157 V to 169 V, and the ratio TON/TOFF between the on period TON and the off period TOFF is 2.0 to 1.0.

Figure 26:
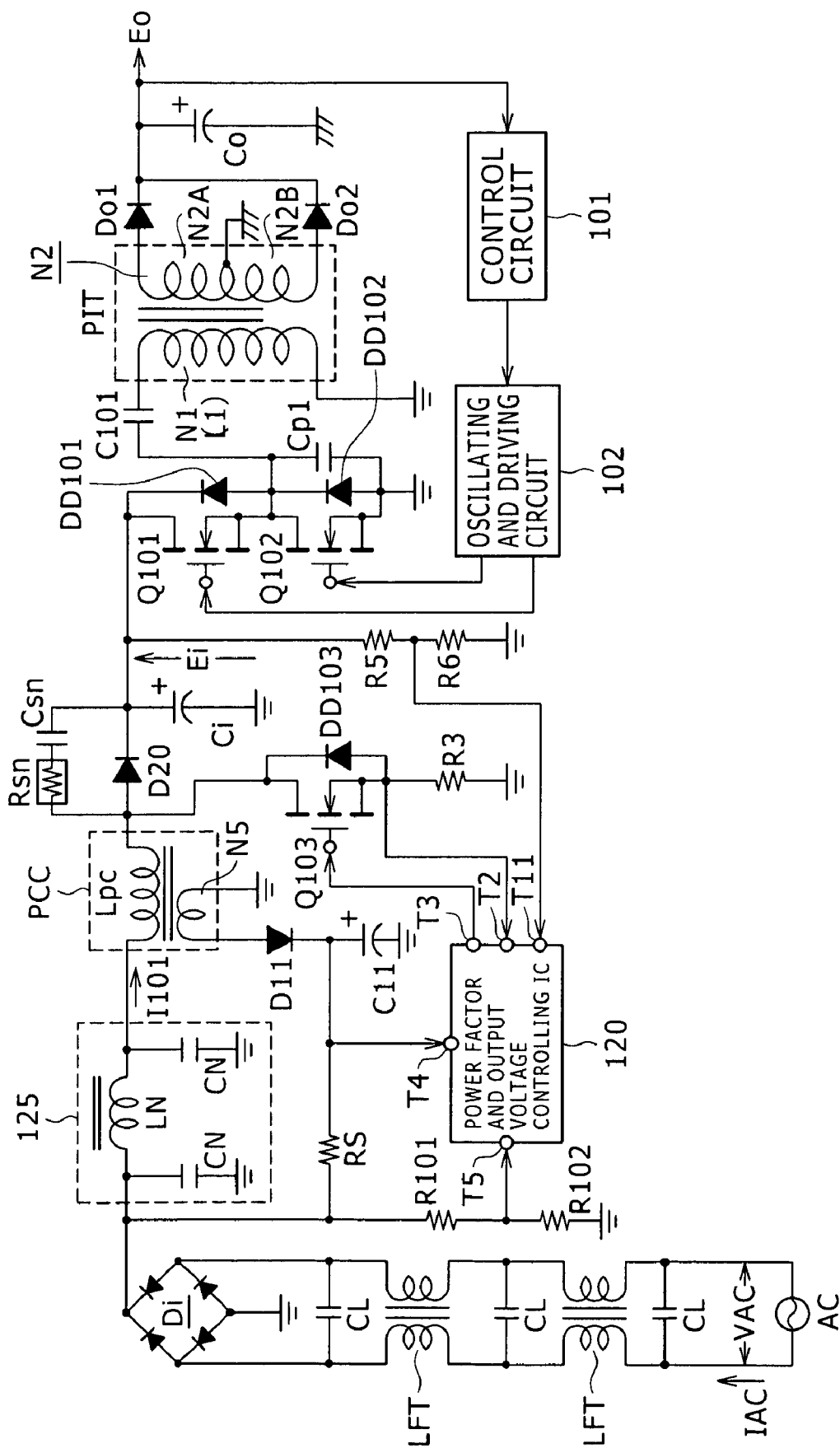
FIG. 26 is a circuit diagram showing an example of configuration of a switching power supply circuit shown in the related art.
Figure 27A:
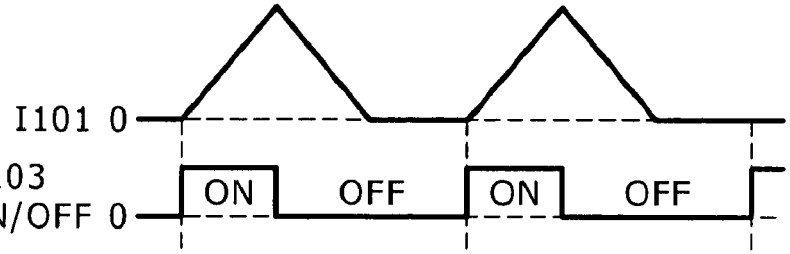
FIGS. 27A, 27B, and 27C are waveform charts of assistance in explaining the operation of the active filter shown in the related art.
Figure 27B:
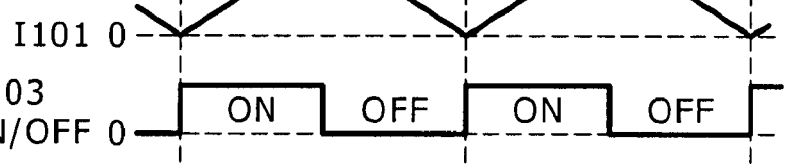
Figure 27C:
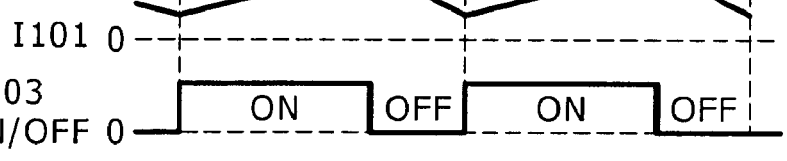
Figure 28:
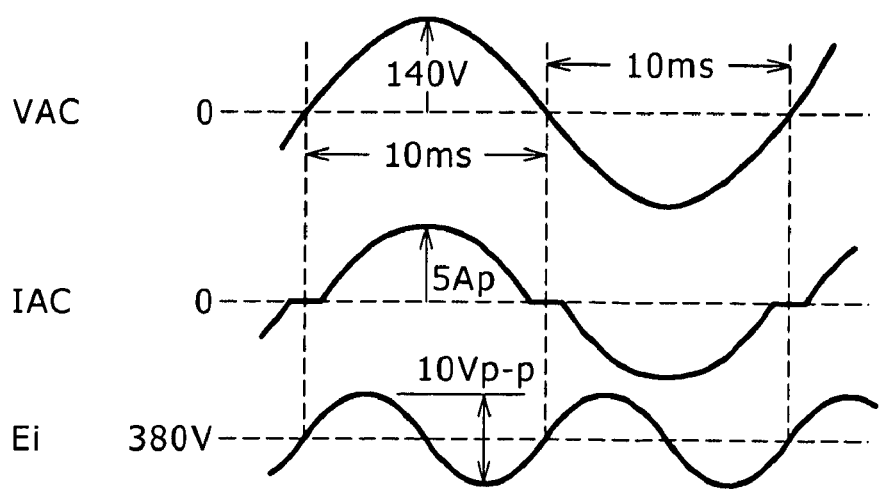
FIG. 28 is a waveform chart showing an alternating input voltage, an alternating input current, and a smoothed voltage in the power supply circuit including the active filter shown in the related art on the basis of cycles of commercial alternating-current power.
Figure 29:
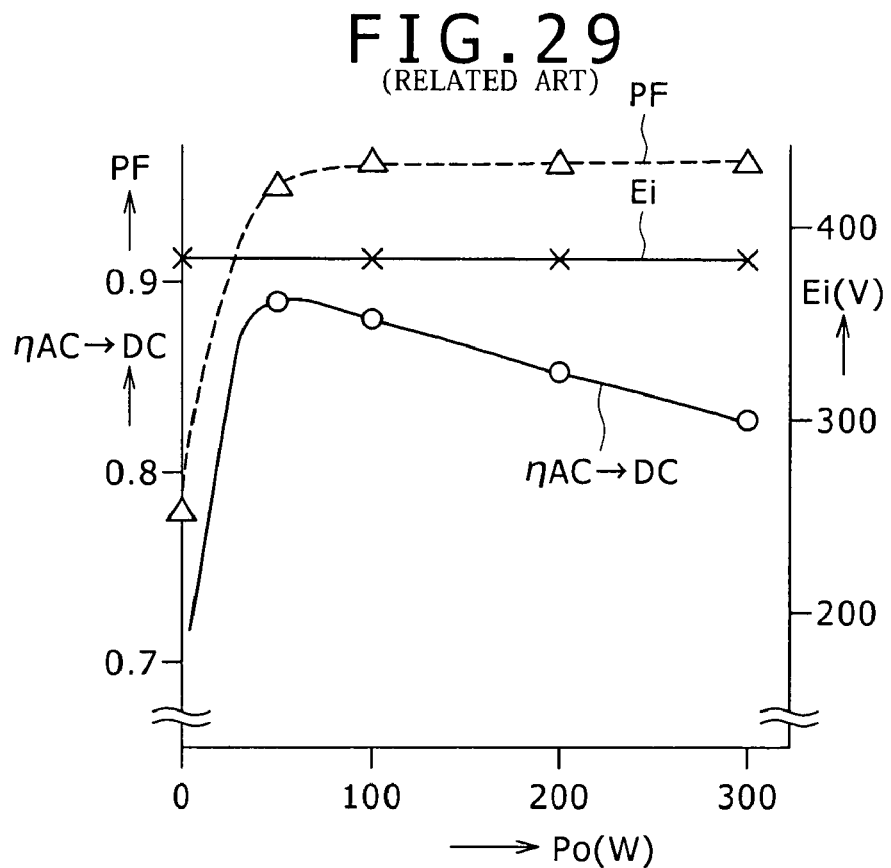
FIG. 29 is a characteristic diagram showing characteristics of power conversion efficiency, a power factor, and a rectified and smoothed voltage with respect to load variation in the power supply circuit including the active filter shown in the related art.
Figure 30:
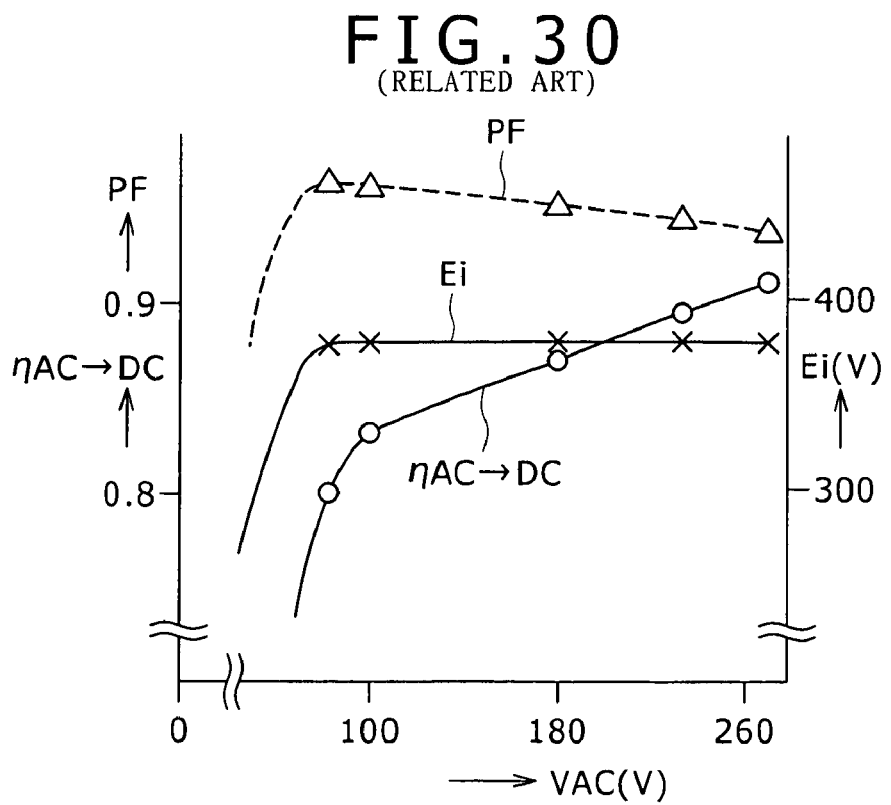
FIG. 30 is a characteristic diagram showing characteristics of the power conversion efficiency, the power factor, and the rectified and smoothed voltage with respect to variation in alternating input voltage in the power supply circuit including the active filter shown in the related art.

Such a switching power supply circuit according to the present embodiment has improved the power conversion efficiency ηAC→DC as compared with the switching power supply circuit shown as background art in FIG. 26. In addition, in the switching power supply circuit according to the present embodiment, a need for an active filter is eliminated, and thereby the number of circuit constituent parts is reduced. That is, as is understood from the description with reference to FIG. 26, the active filter is formed by many parts including the switching element Q103, the power factor and output voltage controlling IC 120 for driving the switching element Q103, and the like. On the other hand, it suffices for the switching power supply circuit according to the embodiment to have the filter capacitor CN, the power factor improving inductor Lo, and a fast rectifying element as the primary side rectifying element Di as additional parts necessary to improve the power factor, and therefore it suffices for the switching power supply circuit according to the embodiment to have a very small number of parts as compared with the active filter. Thus, the cost of the switching power supply circuit according to the embodiment as a power supply circuit having a power factor improving function can be made much lower than that of the circuit shown in FIG. 26. In addition, since the number of parts is greatly reduced, a circuit board can be effectively reduced in size and weight. In this case, the inductance of the power factor improving inductor Lo is a low value of 47 μH, and the inductance of the choke coil PCC is a low value of 82 μH. Further, it suffices to have only one switching element Q1 as switching element. Therefore device size and weight can be reduced.

In addition, in the switching power supply circuit according to the embodiment, the operation of the multiple resonant converter section and the power factor improving section is a so-called soft switching operation, and therefore the level of switching noise is greatly reduced as compared with the circuit using the active filter shown in FIG. 26. In particular, because the current input to the class E switching converter can be approximated to direct current, the level of the switching noise can be made very low.

Further, the switching circuit according to the embodiment has the primary side series resonant circuits and the primary side parallel resonant circuit as well as the secondary side series resonant circuit. Therefore, the secondary side direct-current output voltage Eo can be maintained at a predetermined voltage level by very slight changes in frequency, so that the noise filter can be designed easily. For this reason, the noise filter in one stage composed of one common mode choke coil CMC and two across capacitors CL suffices to meet power supply interference standards. In addition, a sufficient measure against the normal mode noise of the rectification output line can be taken by the single filter capacitor CN.

Further, rectifier diodes Do1 to Do4 on the secondary side and the like operate in synchronism with the switching element Q1. Therefore ground potential interference between the active filter side and the switching converter in the subsequent stage as in the power supply circuit of FIG. 26 does not occur, and ground potential is stabilized irrespective of changes in switching frequency.

Second Embodiment

Figure 6:
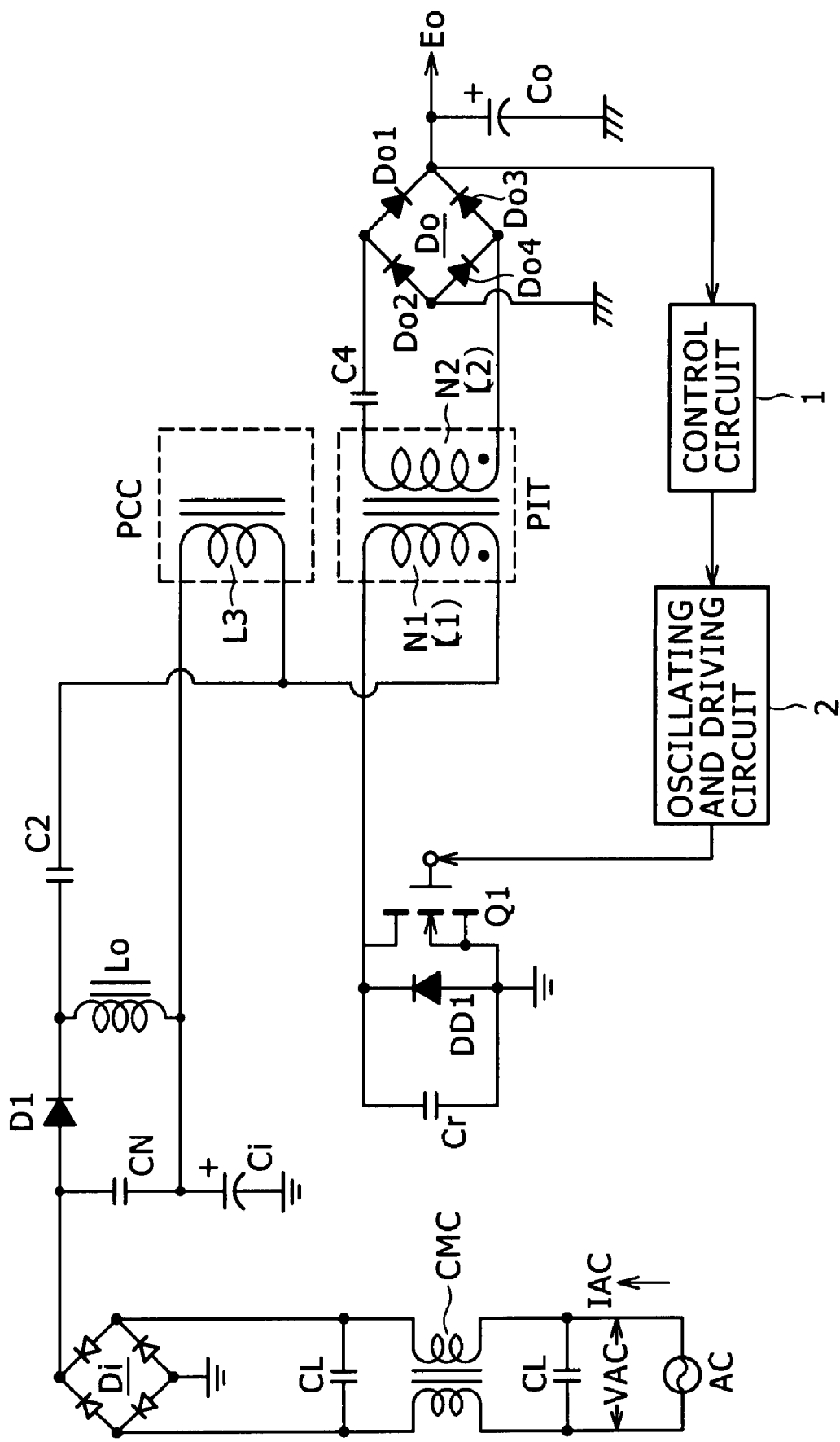
FIG. 6 is a circuit diagram showing an example of configuration of a power supply circuit according to an embodiment.

In a switching power supply circuit according to a second embodiment shown in FIG. 6, same parts as in the first embodiment are identified by the same reference numerals, and description thereof will be omitted. The switching power supply circuit according to the second embodiment employs same configurations as in the first embodiment in many parts. The second embodiment is different from the first embodiment in that a slow rectifying element capable of rectifying a commercial alternating voltage having a frequency of 50 or 60 Hz is used as a primary side rectifying element Di and a fast rectifying element D1 is made to function as a rectifying element for making resonance current flowing through a primary side first series resonant circuit and a primary side second series resonant circuit flow in one direction. In order to make the resonance current flowing through the fast rectifying element D1 and having a frequency of a few ten KHz to 200 KHz flow in one direction, the cathode of the fast rectifying element D1 and one terminal of a power factor improving inductor Lo are connected to a primary side series resonant capacitor C2. The anode of the fast rectifying element D1 is connected to the output side of the primary side rectifying element Di. Another terminal of the power factor improving inductor Lo is connected to a smoothing capacitor Ci. A filter capacitor CN is connected between the smoothing capacitor Ci and the anode of the fast rectifying element D1. With such a configuration, the number of fast rectifying elements used for power factor improvement is decreased from four in the first embodiment to one, thereby reducing cost. The constitutions of the other parts do not differ from those of the first embodiment. Such a connected circuit can produce action and effect that are substantially the same as in the first embodiment.

Third Embodiment

Figure 7:
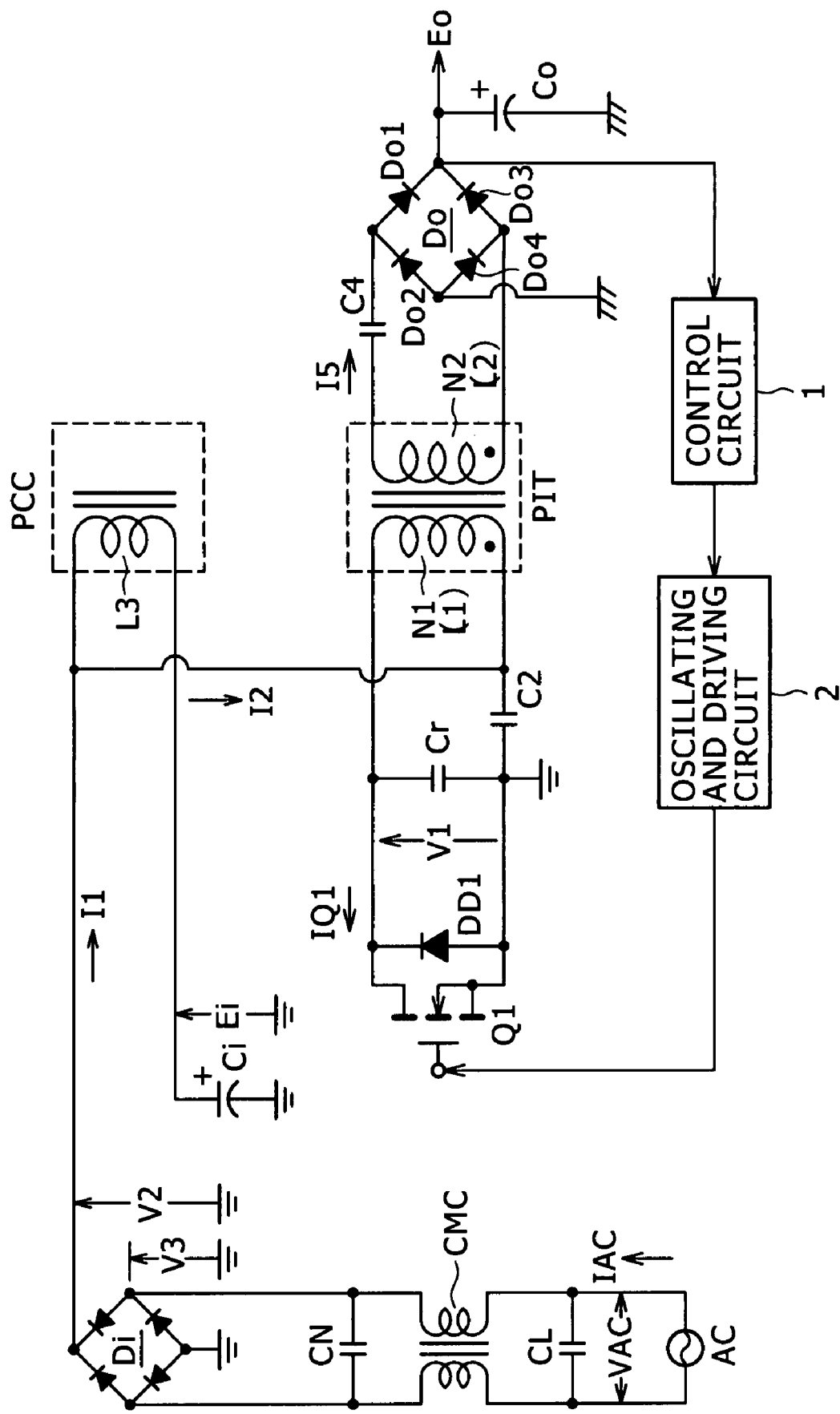
FIG. 7 is a circuit diagram showing an example of configuration of a power supply circuit according to an embodiment.

In a switching power supply circuit according to a third embodiment shown in FIG. 7, same parts as in the first embodiment are identified by the same reference numerals, and description thereof will be omitted. The switching power supply circuit according to the third embodiment employs same configurations as in the first embodiment in many parts. The third embodiment is different from the first embodiment in that a power factor improving section passes a current corresponding to a voltage generated in a primary side series resonant capacitor from an alternating-current power supply via a primary side rectifying element. As for a converter section, the third embodiment is different from the first embodiment in that a choke coil PCC is used between a primary side rectifying element Di and a smoothing capacitor Ci in place of the power factor improving inductance and the primary winding N1 of a converter transformer PIT is connected to the output side of the primary side rectifying element Di. Such a configuration does not use the power factor improving inductor Lo that is necessary in the first embodiment, so that the number of parts can be reduced.

Specifically, the switching power supply circuit according to the third embodiment includes: a rectifying and smoothing section for converting input alternating-current power from an alternating-current power supply AC into primary side direct-current power; a converter section for converting the primary side direct-current power from the rectifying and smoothing section into alternating-current power and further converting the alternating-current power into secondary side direct-current power; and a power factor improving section for improving a power factor. The rectifying and smoothing section includes a primary side rectifying element Di, which is supplied with the input alternating-current power from the alternating-current power supply AC and rectifies the input alternating-current power, and a smoothing capacitor Ci. The converter section includes: a choke coil PCC supplied with the primary side direct-current power from the smoothing capacitor Ci; a converter transformer PIT having a primary winding N1 supplied with the power from the choke coil PCC and a secondary winding N2 magnetically loosely coupled with the primary winding N1; a switching element Q1 for supplying the alternating-current power to the primary winding N1; an oscillating and driving circuit 2 for on-off driving of the switching element Q1; a control circuit 1 for supplying the oscillating and driving circuit 2 with a control signal to make the value of a secondary side direct-current output voltage Eo output by a secondary side rectifying element Do and a smoothing capacitor Co forming a secondary side rectifier circuit connected to the secondary winding N2 a predetermined value; a primary side first series resonant circuit whose primary side first series resonance frequency is governed by an inductance L3 possessed by the choke coil PCC and a primary side series resonant capacitor C2; and a primary side second series resonant circuit whose primary side second series resonance frequency is governed by a leakage inductance L1 occurring at the primary winding N1 and the primary side series resonant capacitor C2, the primary side first series resonance frequency being set at substantially twice the primary side second series resonance frequency. For the power factor improving section to pass a current corresponding to a voltage generated in the primary side series resonant capacitor C2 from the alternating-current power supply via the primary side rectifying element Di (fast rectifying element), the above primary side rectifying element Di is formed by a fast rectifying element.

In the following, description will be made of only characteristic parts of the third embodiment which parts are different from the first embodiment and the second embodiment, and description of similar parts to those of the first embodiment and the second embodiment will be omitted.

Description will first be made of the primary side first series resonant circuit and the primary side second series resonant circuit. The primary side first series resonant circuit forms a current path from the choke coil PCC through the smoothing capacitor Ci and a ground point to the primary side series resonant capacitor C2. The primary side second series resonant circuit forms a current path in one direction from the primary side series resonant capacitor C2 through the primary winding N1 and the drain and the source of the switching element Q1 to the ground point. The primary side second series resonant circuit forms a current path in another direction from the primary side series resonant capacitor C2 through a body diode DD1 to the primary winding N1.

A current flowing through the power factor improving section for power factor improvement is a part of resonance current flowing through the primary side first series resonant circuit and the primary side second series resonant circuit, which part is superimposed on a current I1. That is, by connecting the primary side series resonant capacitor C2 to the primary side rectifying element Di, a resonance current corresponding to a resonance voltage occurring in the primary side series resonant capacitor C2 is passed from the alternating-current power supply AC via the anodes and cathodes of two fast rectifying elements. A current resulting from adding together the resonance current for power factor improvement and a current obtained by rectifying commercial alternating-current power from the alternating-current power supply AC flows as the current I1.

That is, when the power factor improving section is not provided, the current I1 has a waveform in the shape of a pulse flowing only around the peak of a voltage V2. However, the resonance current corresponding to the resonance voltage occurring in the primary side series resonant capacitor C2 is also passed outside the vicinity of the peak of the voltage V2, whereby a conduction angle is increased. Thus, in the present embodiment, the resonance voltage occurring in the primary side series resonant capacitor C2 is fed back to the smoothing capacitor Ci via the choke coil PCC, and thereby a voltage feedback type power factor improving section is formed.

The concrete constants of parts in the third embodiment are set as follows. The secondary side direct-current output voltage Eo is 175 V. The period TOFF of the switching element Q1 is changed according to variation in load power Po, the period TON of the switching element Q1 is reduced with decrease in load power Po and increase in alternating input voltage VAC, and the value of the secondary side direct-current output voltage Eo is made constant by increasing switching frequency.

A ferrite material of the converter transformer PIT is EER-35. A gap of the converter transformer PIT is 1.2 mm. The coupling coefficient of the converter transformer PIT is 0.82. The primary winding N1 is set at 48 T. The secondary winding N2 is set at 30 T. The value of a primary side parallel resonant capacitor Cr is 6800 pF. The value of the primary side series resonant capacitor C2 is 0.1 µF. The value of a secondary side series resonant capacitor C4 is 0.056 µF. The value of a filter capacitor CN is 1 µF. The value of the inductance L3 of the choke coil PCC is 82 µH. The specifications of the primary side rectifying element Di are 3 A/600 V specifications. The specifications of the secondary side rectifying element Do are 5 A/200 V specifications. Each of the primary side rectifying element Di and the secondary side rectifying element Do is a fast rectifying element.

Figure 8:
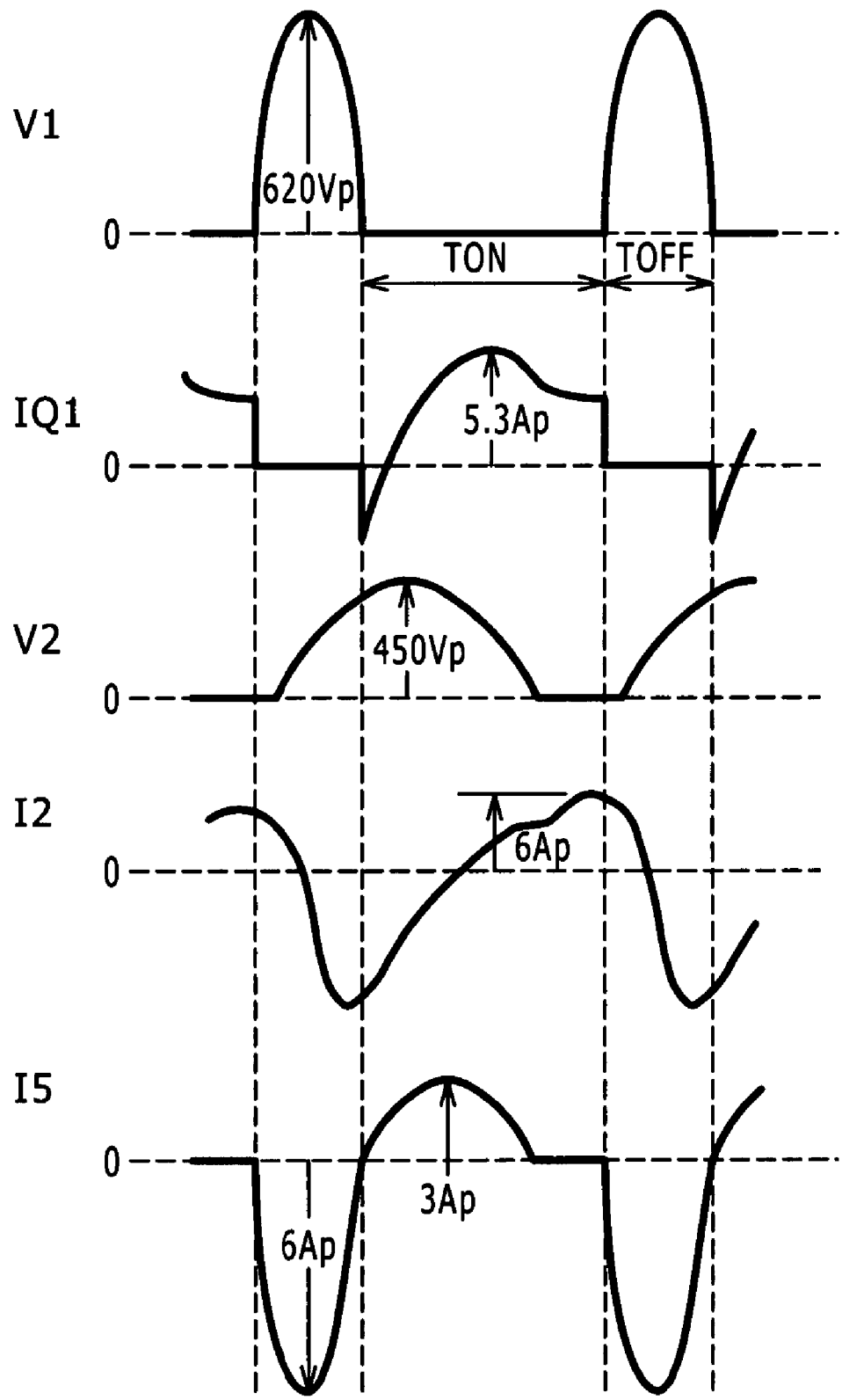
FIG. 8 is a waveform chart showing operation of principal parts in the power supply circuit according to the embodiment on the basis of switching cycles.

FIG. 8 shows operating waveforms of principal parts of the circuit when the alternating input voltage is 100 V and a maximum load power is 300 W on the basis of switching cycles. FIG. 8 shows, from a top to a bottom, a voltage V1, a current IQ1, a voltage V2, a current I2, and a current I5.

Figure 9:
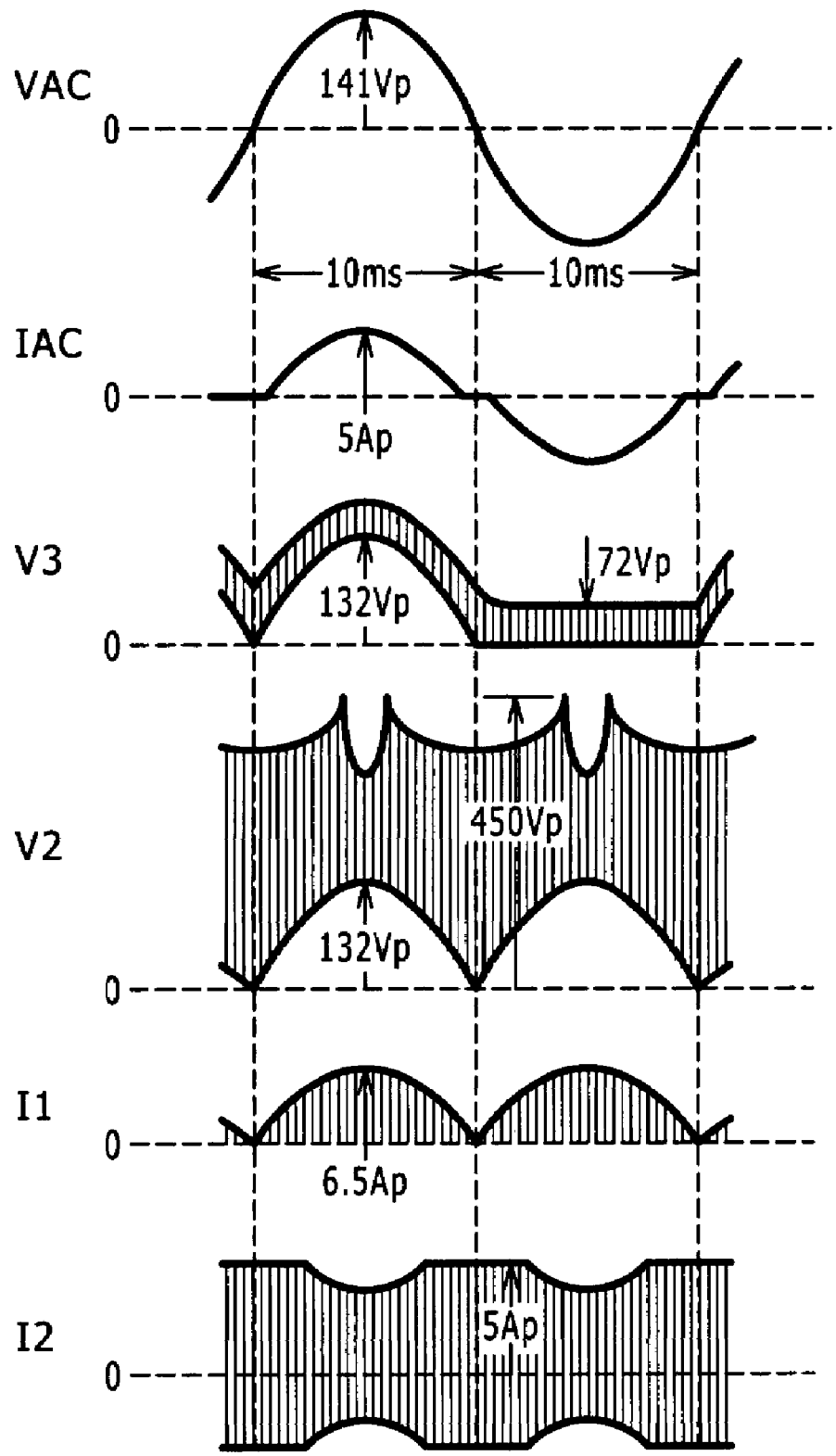
FIG. 9 is a waveform chart showing operation of principal parts in the power supply circuit according to the embodiment on the basis of cycles of alternating input voltage.

FIG. 9 shows operating waveforms of principal parts when the alternating input voltage is 100 V and the maximum load power is 300 w on the basis of the cycles of the commercial alternating-current power supply. FIG. 9 shows, from a top to a bottom, the alternating input voltage VAC, an alternating input current IAC, a voltage V3, the voltage V2, the current I1, and the current I2. Each of hatched parts of the voltage V3, the voltage V2, the current I1, and the current I2 in FIG. 9 indicates that switching is performed.

Figure 10:
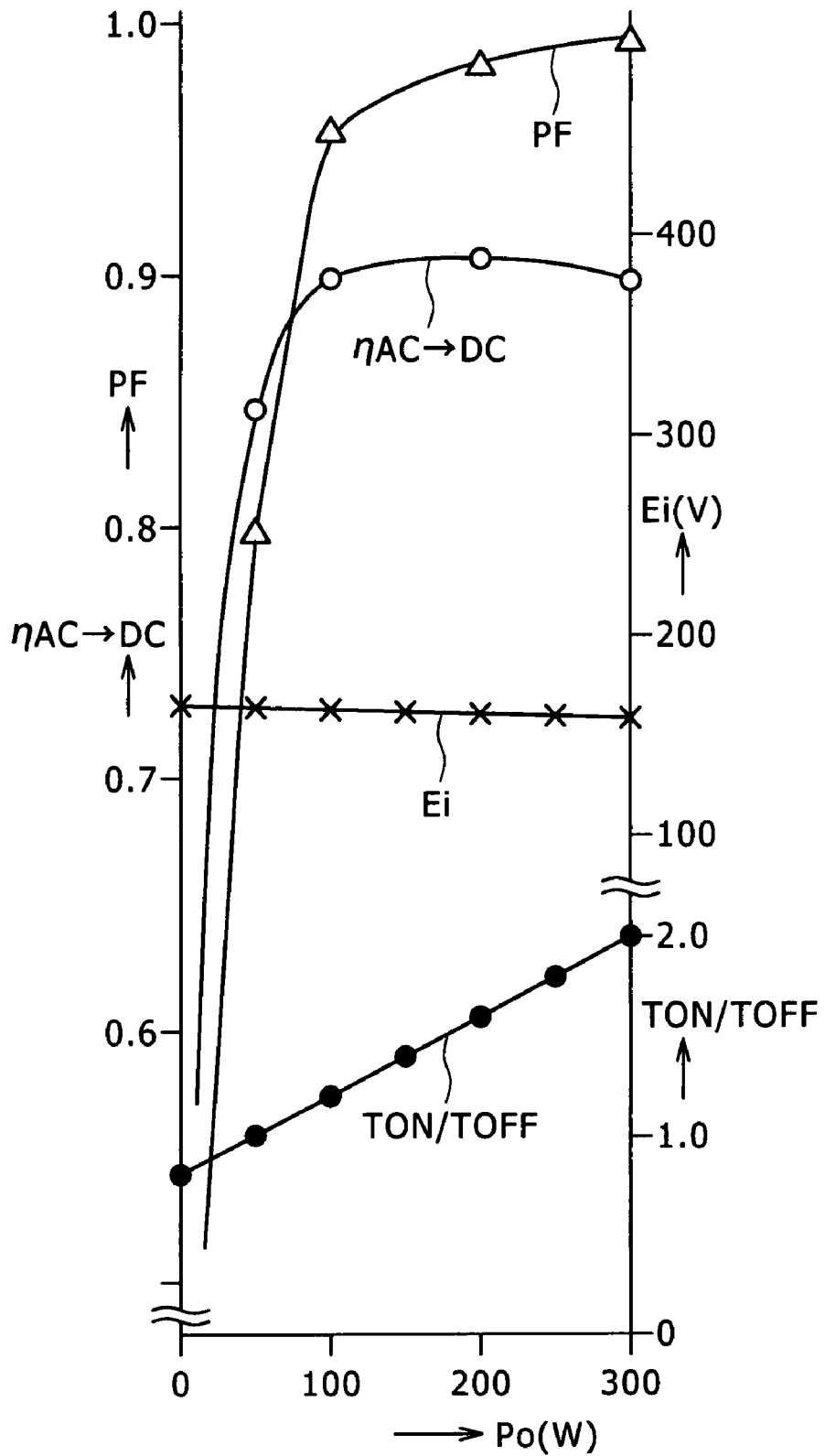
FIG. 10 is a diagram showing a rectified and smoothed voltage, a power factor, power conversion efficiency, and a ratio TON/TOFF with respect to load variation in the power supply circuit according to the embodiment.

FIG. 10 shows a direct-current input voltage Ei, a power factor PF, efficiency ηAC→DC of power conversion from alternating-current input power to direct-current output power, and a ratio TON/TOFF between the on period TON and the off period TOFF of the switching element Q1 with respect to load variation in a range where the value of load power Po is 0 W to 300 W under an input voltage condition where the value of the alternating input voltage VAC is 100 V.

Introducing a part of representative characteristics that can be read from FIG. 10, for example, the value of the power factor PF when the load power Po is 300 W is 0.931, and the value of the power factor PF when the load power Po is 50 W is 0.76, these values representing a high power factor. The power conversion efficiency ηAC→DC when the load power Po is 300 W is high at 90.5%. In the range where the load power Po is 300 W to 0 W, the value of the direct-current input voltage Ei is 155 V to 175 V, and the ratio TON/TOFF between the on period TON and the off period TOFF is 2.0 to 0.8.

Such a switching power supply circuit according to the present embodiment has improved the power conversion efficiency ηAC→DC as compared with the switching power supply circuit shown as background art in FIG. 26. In addition, in the switching power supply circuit according to the present embodiment, a need for an active filter is eliminated, and thereby the number of circuit constituent parts is reduced. That is, as is understood from the description with reference to FIG. 26, the active filter is formed by many parts including the switching element Q103, the power factor and output voltage controlling IC 120 for driving the switching element Q103, and the like. On the other hand, it suffices for the switching power supply circuit according to the embodiment to have the filter capacitor CN and a fast rectifying element as the primary side rectifying element Di as additional parts necessary to improve the power factor, and therefore it suffices for the switching power supply circuit according to the embodiment to have a very small number of parts as compared with the active filter. Thus, the cost of the switching power supply circuit according to the embodiment as a power supply circuit having a power factor improving function can be made much lower than that of the circuit shown in FIG. 26. In addition, since the number of parts is greatly reduced, a circuit board can be effectively reduced in size and weight. In this case, the inductance of the choke coil PCC is a low value of 82 µH. Further, it suffices to have only one switching element Q1 as switching element. Therefore device size and weight can be reduced.

In addition, in the switching power supply circuit according to the embodiment, the operation of the multiple resonant converter section and the power factor improving section is a so-called soft switching operation, and therefore the level of switching noise is greatly reduced as compared with the circuit using the active filter shown in FIG. 26. In particular, because the current input to the class E switching converter can be approximated to direct current, the level of the switching noise can be made very low.

Further, the switching circuit according to the embodiment has the primary side series resonant circuits and a primary side parallel resonant circuit as well as a secondary side series resonant circuit. Therefore, the secondary side direct-current output voltage Eo can be maintained at a predetermined voltage level by very slight changes in frequency, so that the noise filter can be designed easily. For this reason, the noise filter in one stage composed of one common mode choke coil CMC and two across capacitors CL suffices to meet power supply interference standards. In addition, a sufficient measure against the normal mode noise of the rectification output line can be taken by the single filter capacitor CN.

Further, rectifier diodes Do1 to Do4 on the secondary side and the like operate in synchronism with the switching element Q1. Therefore ground potential interference between the active filter side and the switching converter in the subsequent stage as in the power supply circuit of FIG. 26 does not occur, and ground potential is stabilized irrespective of changes in switching frequency.

Fourth Embodiment

Figure 11:
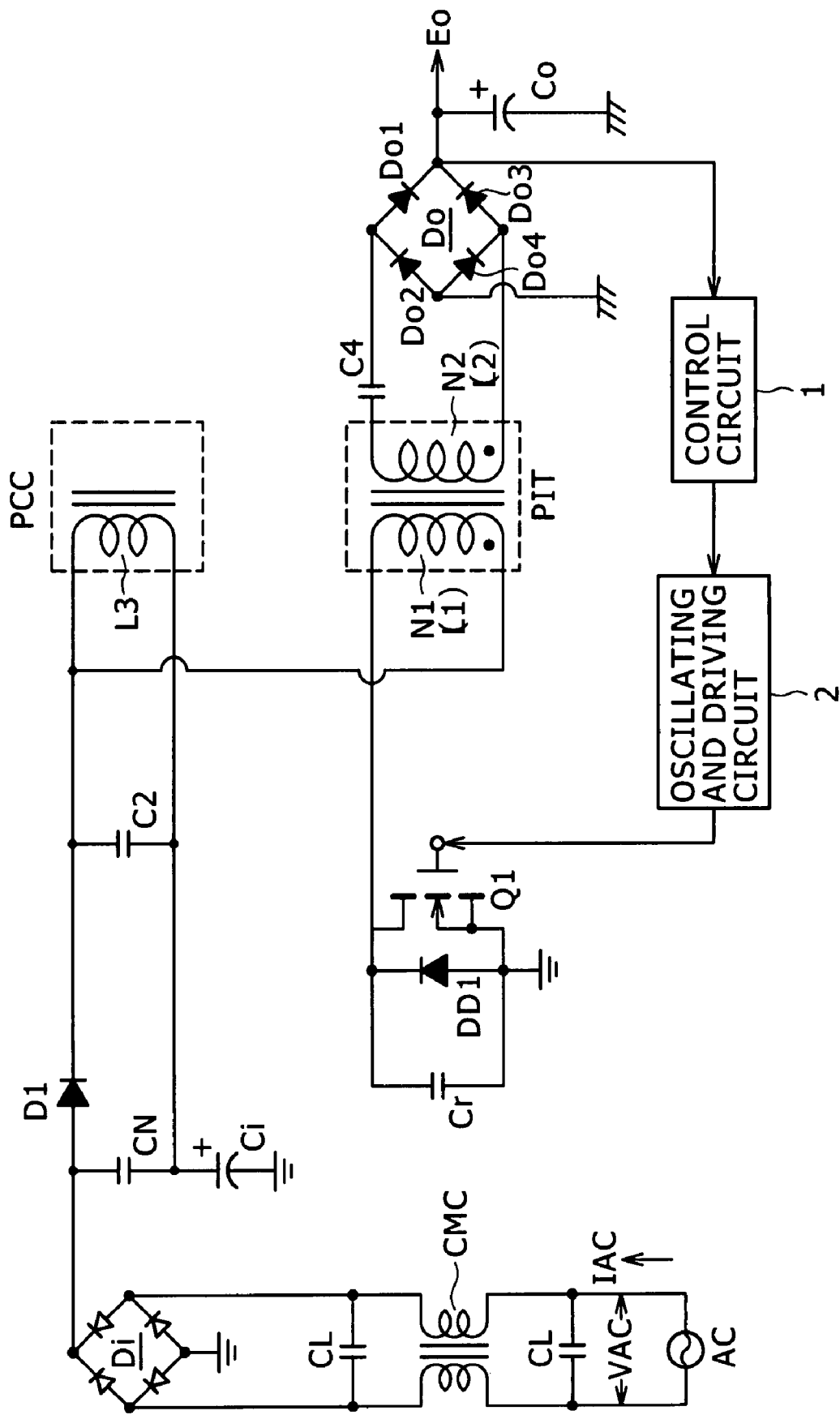
FIG. 11 is a circuit diagram showing an example of configuration of a power supply circuit according to an embodiment.

In a switching power supply circuit according to a fourth embodiment shown in FIG. 11, same parts as in the third embodiment are identified by the same reference numerals, and description thereof will be omitted. As in the second embodiment, a slow rectifying element is used as a primary side rectifying element Di, and resonance current is made to flow in one direction by using a fast rectifying element D1. As in the third embodiment, a choke coil PCC is used in place of a power factor improving inductor. The fourth embodiment is different from the third embodiment in that a current path of a primary side first series resonant circuit of a converter section is formed by only the choke coil PCC and a primary side series resonant capacitor C2, a current path in one direction of a primary side second series resonant circuit is a path from a smoothing capacitor Ci through the primary side series resonant capacitor C2 to a primary winding N1 and then from the drain to the source of a switching element Q1, and a current path in another direction of the primary side second series resonant circuit is a path from a body diode DD1 of the switching element Q1 through the primary winding N1 and the primary side series resonant capacitor C2 to the smoothing capacitor Ci. A power factor improving section uses a slow rectifying element as the primary side rectifying element Di, and the fast rectifying element D1 is connected to the output side of the primary side rectifying element Di, so that a current corresponding to a voltage occurring in the primary side series resonant capacitor C2 is passed from an alternating-current power supply AC via the fast rectifying element D1.

The converter section in the fourth embodiment is the same as in the first to third embodiments in that ZVS operation is performed with the resonance frequency of the primary side first series resonant circuit set at substantially twice the resonance frequency of the primary side second series resonant circuit.

Fifth Embodiment

Figure 12:
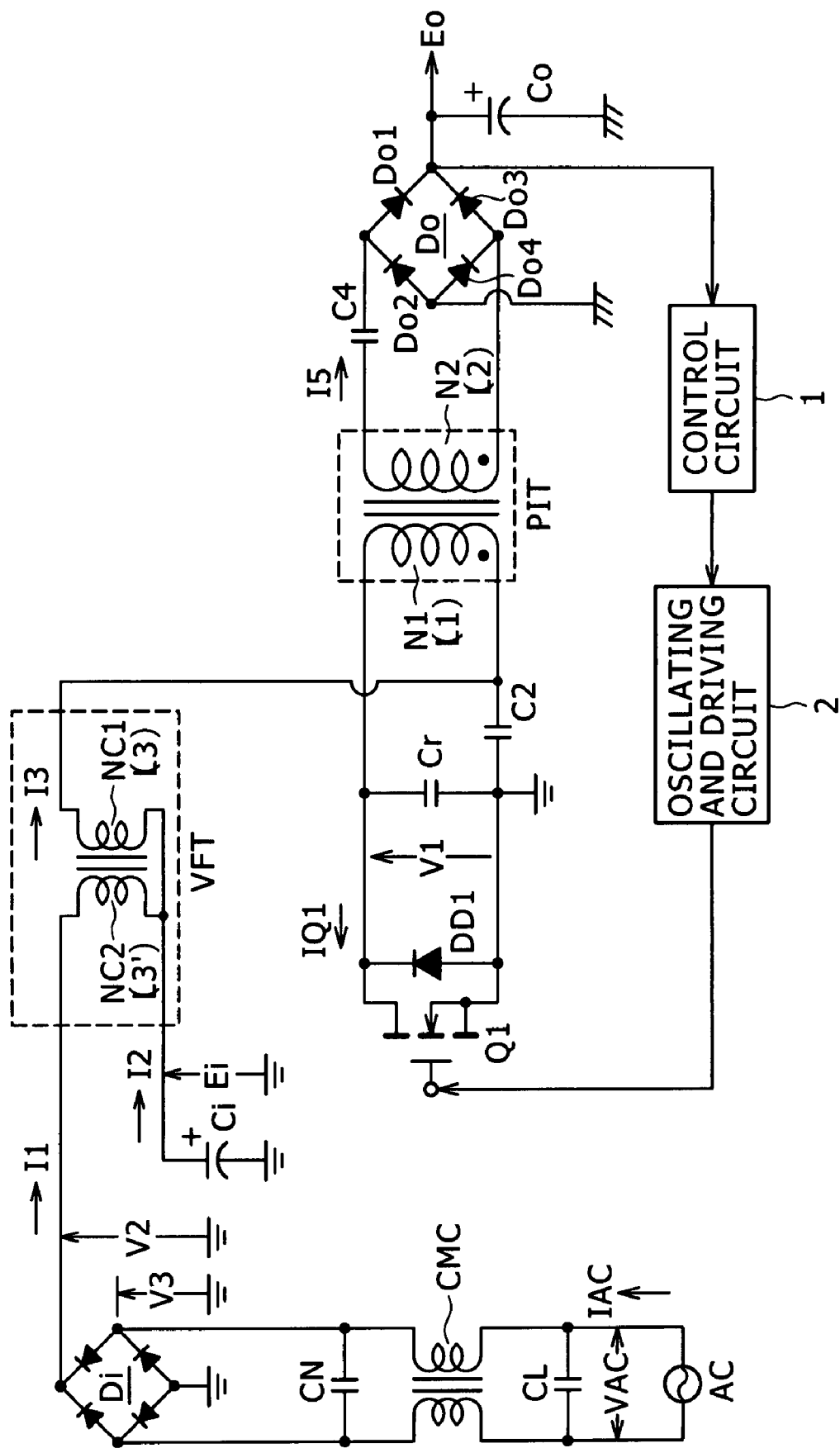
FIG. 12 is a circuit diagram showing an example of configuration of a power supply circuit according to an embodiment.

In a switching power supply circuit according to a fifth embodiment shown in FIG. 12, same parts as in the third embodiment shown in FIG. 7 are identified by the same reference numerals, and description thereof will be omitted. The switching power supply circuit according to the fifth embodiment is a modification of the third embodiment. The fifth embodiment is different from the third embodiment in that a converter section uses a choke transformer VFT having a choke coil primary winding NC1 and a choke coil secondary winding NC2 magnetically loosely coupled with each other in place of the choke coil PCC used in the third embodiment, and the function of the choke coil PCC is performed by a leakage inductance L3 occurring at the choke coil primary winding NC1. As for a power factor improving section, the current corresponding to the voltage occurring in the primary side series resonant capacitor C2 of the power factor improving section flows through the choke coil secondary winding NC2 of the choke transformer VFT.

Specifically, the switching power supply circuit according to the fifth embodiment includes: a rectifying and smoothing section for converting input alternating-current power from an alternating-current power supply AC into primary side direct-current power; a converter section for converting the primary side direct-current power from the rectifying and smoothing section into alternating-current power and further converting the alternating-current power into secondary side direct-current power; and a power factor improving section for improving a power factor. The rectifying and smoothing section includes a primary side rectifying element Di, which is supplied with the input alternating-current power from the alternating-current power supply AC and rectifies the input alternating-current power, and a smoothing capacitor Ci. The converter section includes: the choke coil primary winding NC1 of the choke transformer VFT supplied with the primary side direct-current power from the smoothing capacitor Ci; a converter transformer PIT having a primary winding N1 supplied with the power from the choke coil primary winding NC1 and a secondary winding N2 magnetically loosely coupled with the primary winding N1; a switching element Q1 for supplying the alternating-current power to the primary winding N1; an oscillating and driving circuit 2 for on-off driving of the switching element Q1; a control circuit 1 for supplying the oscillating and driving circuit 2 with a control signal to make the value of a secondary side direct-current output voltage Eo output by a secondary side rectifying element Do and a smoothing capacitor Co forming a secondary side rectifier circuit connected to the secondary winding N2 a predetermined value; a primary side first series resonant circuit whose primary side first series resonance frequency is governed by an inductance L3 occurring at the choke coil primary winding NC1 and a primary side series resonant capacitor C2; and a primary side second series resonant circuit whose primary side second series resonance frequency is governed by a leakage inductance L1 occurring at the primary winding N1 and the primary side series resonant capacitor C2, the primary side first series resonance frequency being set at substantially twice the primary side second series resonance frequency. For the power factor improving section to pass a current corresponding to a voltage generated in the primary side series resonant capacitor C2 from the alternating-current power supply via the primary side rectifying element Di (fast rectifying element), the above primary side rectifying element Di is formed by a fast rectifying element. The voltage occurring in the primary side series resonant capacitor C2 is applied to the choke coil primary winding NC1, a voltage similar to the voltage occurring in the primary side series resonant capacitor C2 is generated in the choke coil secondary winding NC2, and the current corresponding to the voltage occurring in the primary side series resonant capacitor C2 is made to flow from the alternating-current power supply. Incidentally, the frequency of a primary side parallel resonant circuit is substantially twice the primary side first series resonance frequency.

In the following, description will be made of only characteristic parts of the fifth embodiment which parts are different from the first to fourth embodiments, and description of similar parts to those of the first to fourth embodiments will be omitted.

Description will first be made of the primary side first series resonant circuit and the primary side second series resonant circuit. The primary side first series resonant circuit forms a current path from the leakage inductance L3 occurring at the choke coil primary winding NC1 through the smoothing capacitor Ci and a ground point to the primary side series resonant capacitor C2. The primary side second series resonant circuit forms a current path in one direction from the primary side series resonant capacitor C2 through the primary winding N1 and the drain and the source of the switching element Q1 to the ground point. The primary side second series resonant circuit forms a current path in another direction from the primary side series resonant capacitor C2 through a body diode DD1 to the primary winding N1.

Figure 2:
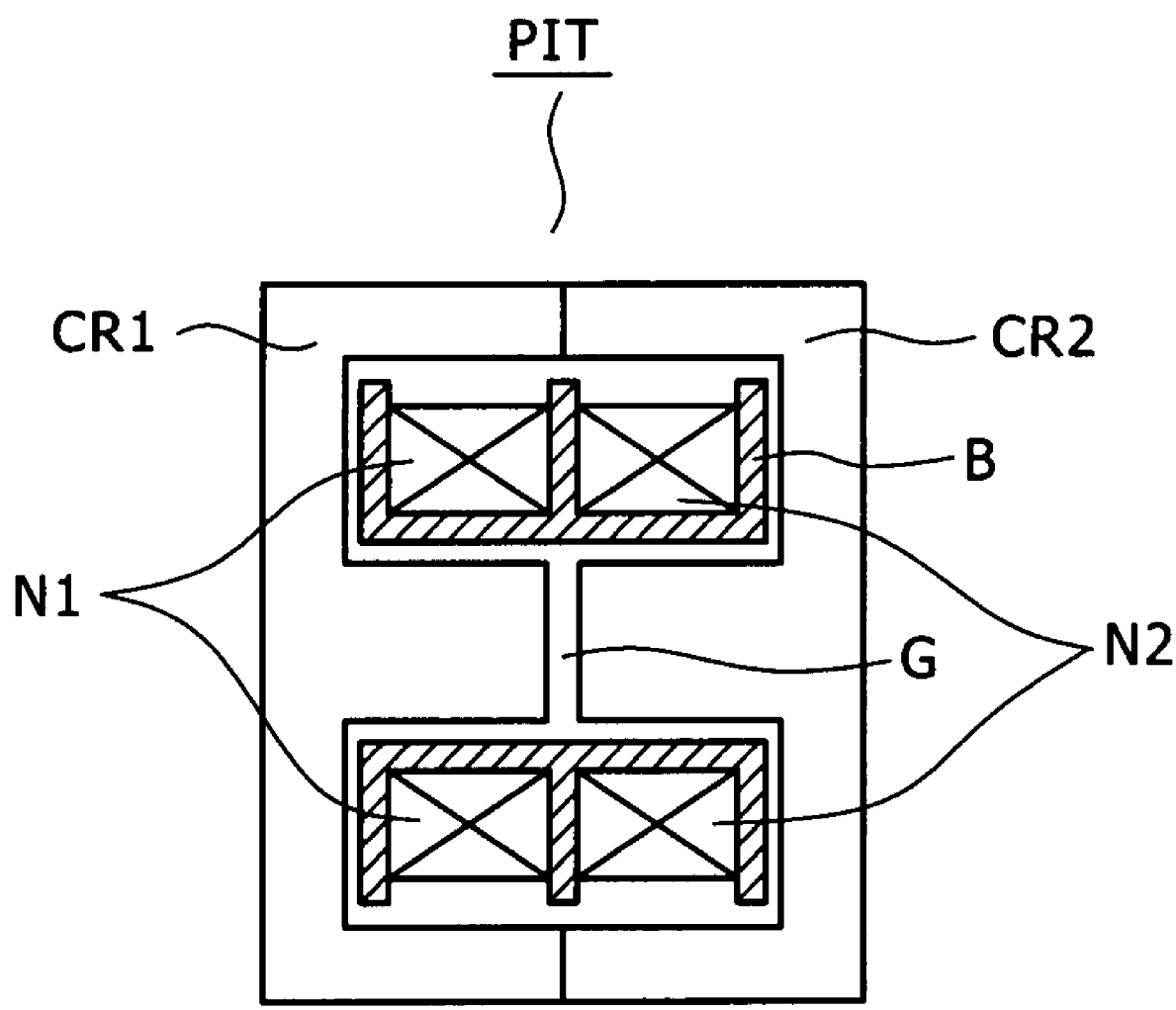
FIG. 2 is a diagram showing an example of structure of a converter transformer according to the embodiment.

The choke transformer VFT has substantially the same structure as the converter transformer PIT shown in FIG. 2. The choke transformer VFT has the choke coil primary winding NC1 and the choke coil secondary winding NC2 magnetically loosely coupled with each other. Thereby the choke coil primary winding NC1 can produce the leakage inductance L3. In addition, the choke coil secondary winding NC2 produces a leakage inductance L3'. A ratio between voltages generated in the choke coil primary winding NC1 and the choke coil secondary winding NC2 is equal to a ratio between the respective numbers of turns of the choke coil primary winding NC1 and the choke coil secondary winding NC2. By using the choke transformer VFT having such a structure and optimizing the turns ratio, it is possible to separately adjust the primary side first series resonance frequency and the current corresponding to the voltage occurring in the primary side series resonant capacitor C2 as current passed through the power factor improving section, and optimize each of the primary side first series resonance frequency and the current.

The current flowing through the power factor improving section for power factor improvement is a part of resonance current flowing through the primary side first series resonant circuit and the primary side second series resonant circuit, which part is superimposed on a current I1. That is, by connecting the primary side series resonant capacitor C2 to the choke coil primary winding NC1 and connecting the choke coil secondary winding NC2 to the primary side rectifying element Di, the resonance current corresponding to the resonance voltage occurring in the primary side series resonant capacitor C2 is passed from the alternating-current power supply AC via the anodes and cathodes of two fast rectifying elements. A current resulting from adding together the resonance current for power factor improvement and a current obtained by rectifying commercial alternating-current power from the alternating-current power supply AC flows as the current I1.

That is, when the power factor improving section is not provided, the current I1 has a waveform in the shape of a pulse flowing only around the peak of a voltage V2. However, the resonance current corresponding to the resonance voltage occurring in the primary side series resonant capacitor C2 is also passed outside the vicinity of the peak of the voltage V2, whereby a conduction angle is increased. On the other hand, the primary side direct-current power from the smoothing capacitor Ci is supplied to the primary winding N1 of the converter transformer PIT. Thus, in the present embodiment, the resonance voltage occurring in the primary side series resonant capacitor C2 is fed back to the smoothing capacitor C1 via the choke coil secondary winding NC2 of the choke transformer VFT, and thereby a voltage feedback type power factor improving section is formed.

The concrete constants of parts in the fifth embodiment are set as follows. The secondary side direct-current output voltage Eo is 175 V. The period TOFF of the switching element Q1 is changed according to variation in load power Po, the period TON of the switching element Q1 is reduced with decrease in load power Po and increase in alternating input voltage VAC, and the value of the secondary side direct-current output voltage Eo is made constant by increasing switching frequency.

A ferrite material of the converter transformer PIT is EER-35. A gap of the converter transformer PIT is 1.2 mm. The coupling coefficient of the converter transformer PIT is 0.82. The primary winding N1 is set at 45 T. The secondary winding N2 is set at 30 T. The value of a primary side parallel resonant capacitor Cr is 6800 pF. The value of the primary side series resonant capacitor C2 is 0.1 µF. The value of a secondary side series resonant capacitor C4 is 0.056 µF. The value of a filter capacitor CN is 1 µF. The value of the leakage inductance L3 occurring at the choke coil primary winding NC1 is 82 µH. The value of the leakage inductance L3' occurring at the choke coil secondary winding NC2 is 82 µH. The specifications of the primary side rectifying element Di are 3 A/600 V specifications. The specifications of the secondary side rectifying element Do are 5 A/200 V specifications. Each of the primary side rectifying element Di and the secondary side rectifying element Do is a fast rectifying element.

Figure 13:
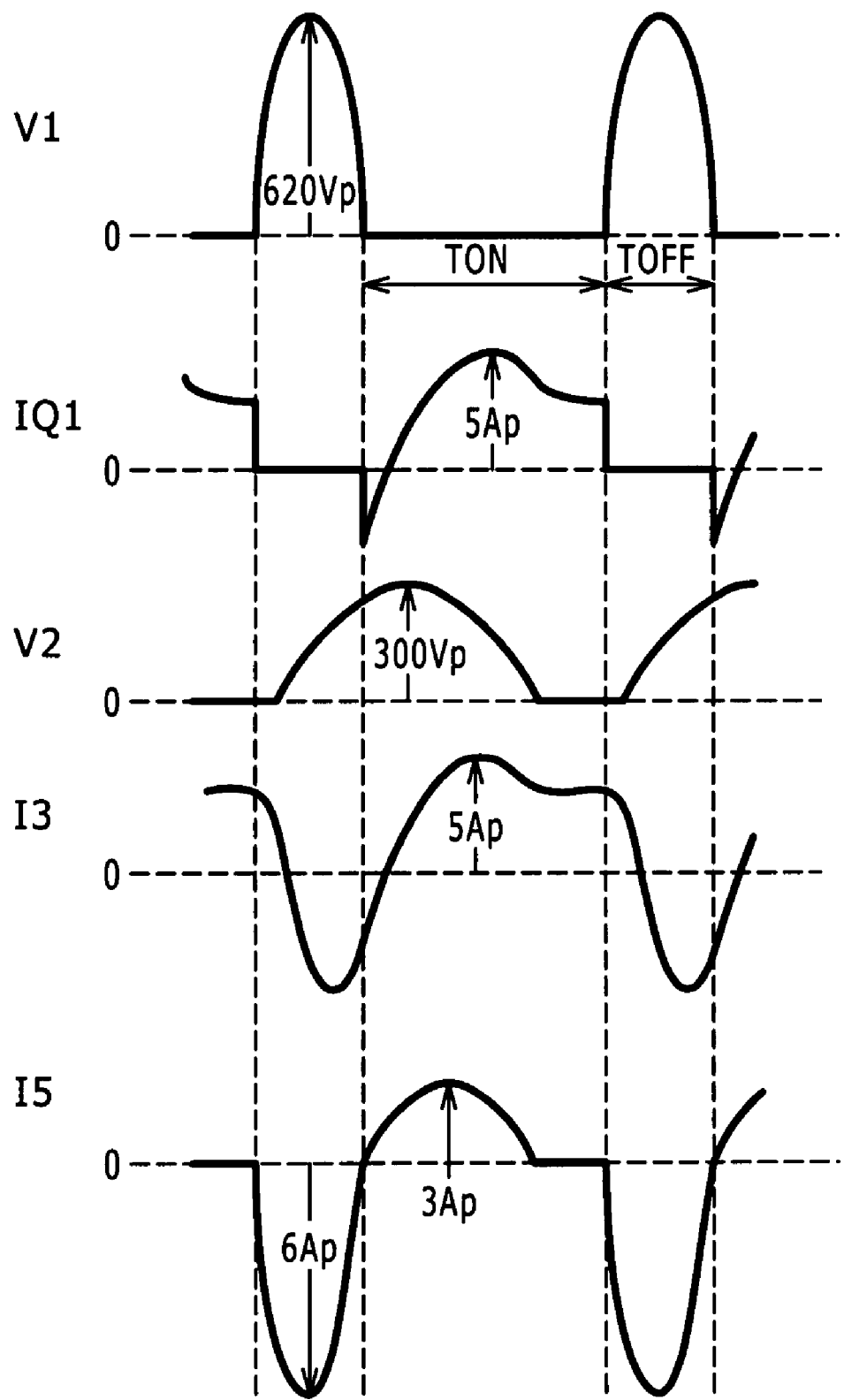
FIG. 13 is a waveform chart showing operation of principal parts in the power supply circuit according to the embodiment on the basis of switching cycles.

FIG. 13 shows operating waveforms of principal parts of the circuit when the alternating input voltage is 100 V and a maximum load power is 300 W on the basis of switching cycles. FIG. 13 shows, from a top to a bottom, a voltage V1, a current IQ1, a voltage V2, a current I3, and a current I5.

Figure 14:
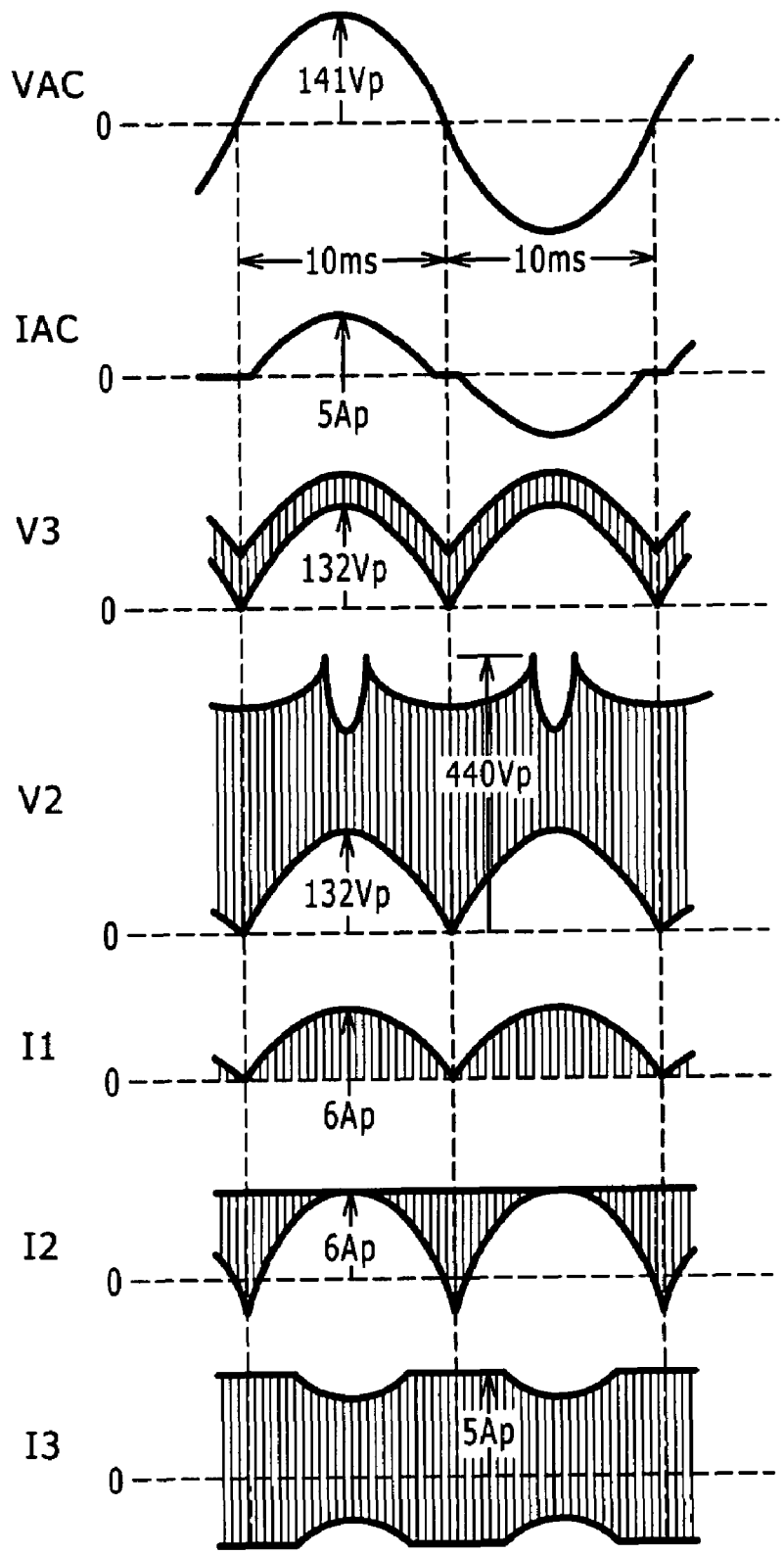
FIG. 14 is a waveform chart showing operation of principal parts in the power supply circuit according to the embodiment on the basis of cycles of alternating input voltage.

FIG. 14 shows operating waveforms of principal parts when the alternating input voltage is 100 V and the maximum load power is 300 W on the basis of the cycles of the commercial alternating-current power supply. FIG. 14 shows, from a top to a bottom, the alternating input voltage VAC, an alternating input current IAC, a voltage V3, the voltage V2, the current I1, a current I2, and the current I3. Each of hatched parts of the voltage V3, the voltage V2, the current I1, the current I2, and the current I3 in FIG. 13 indicates that switching is performed.

Figure 15:
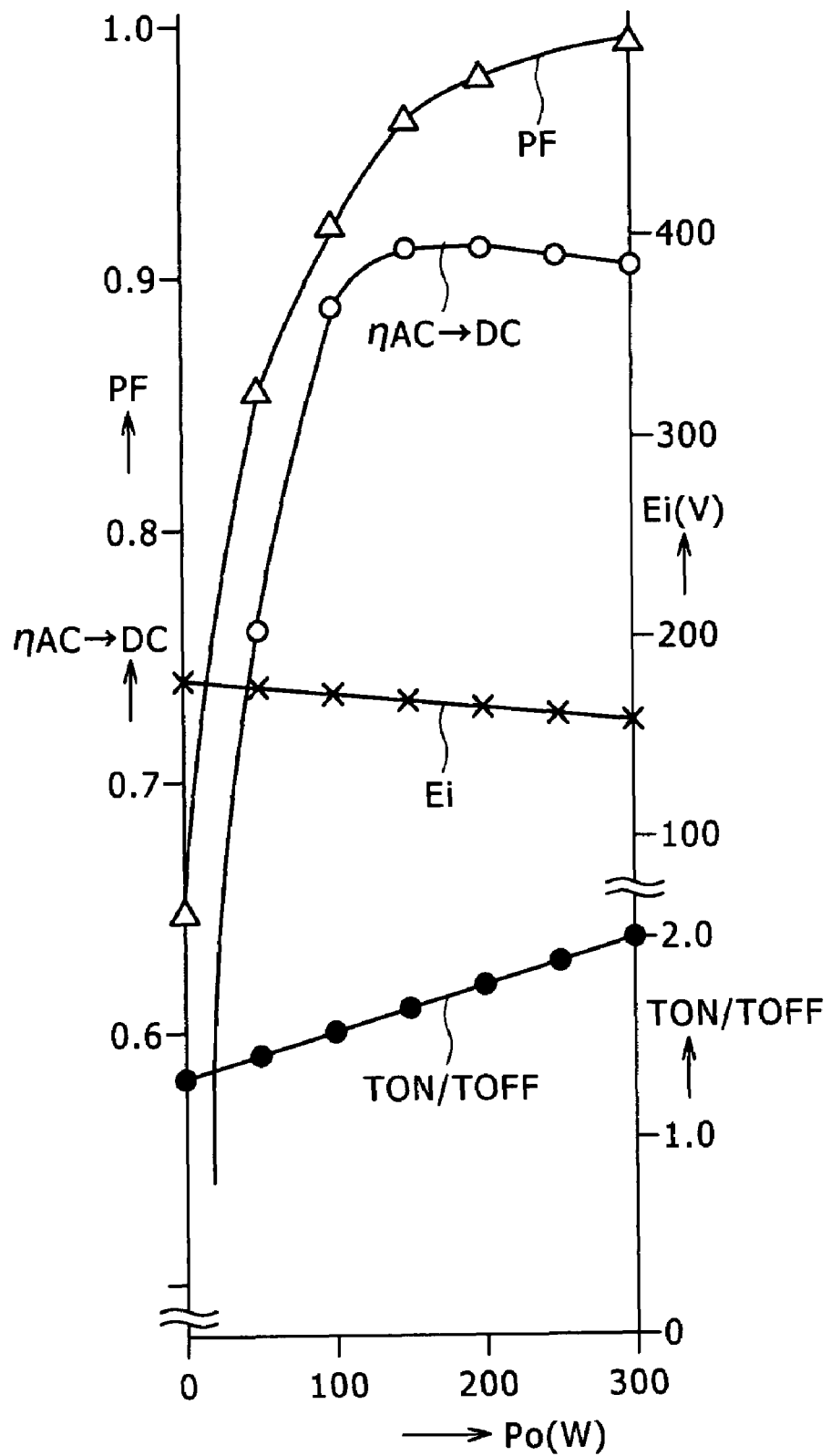
FIG. 15 is a diagram showing a rectified and smoothed voltage, a power factor, power conversion efficiency, and a ratio TON/TOFF with respect to load variation in the power supply circuit according to the embodiment.

FIG. 15 shows a direct-current input voltage Ei, a power factor PF, efficiency ηAC→DC of power conversion from alternating-current input power to direct-current output power, and a ratio TON/TOFF between the on period TON and the off period TOFF of the switching element Q1 with respect to load variation in a range where the value of load power Po is 0 w to 300 w under an input voltage condition where the value of the alternating input voltage VAC is 100 V.

Introducing a part of representative characteristics that can be read from FIG. 15, for example, the value of the power factor PF when the load power Po is 300 W is 0.991, and the value of the power factor PF when the load power Po is 50 W is 0.76, these values representing a high power factor. The power conversion efficiency ηAC→DC when the load power Po is 300 W is high at 90.5%. In the range where the load power Po is 300 W to 0 W, the value of the direct-current input voltage Ei is 155 V to 175 V, and the ratio TON/TOFF between the on period TON and the off period TOFF is 2.0 to 1.25.

Such a switching power supply circuit according to the present embodiment has improved the power conversion efficiency ηAC→DC as compared with the switching power supply circuit shown as background art in FIG. 26. In addition, in the switching power supply circuit according to the present embodiment, a need for an active filter is eliminated, and thereby the number of circuit constituent parts is reduced. That is, as is understood from the description with reference to FIG. 26, the active filter is formed by many parts including the switching element Q103, the power factor and output voltage controlling IC 120 for driving the switching element Q103, and the like. On the other hand, it suffices for the switching power supply circuit according to the embodiment to have the filter capacitor CN and a fast rectifying element as the primary side rectifying element Di as additional parts necessary to improve the power factor, and therefore it suffices for the switching power supply circuit according to the embodiment to have a very small number of parts as compared with the active filter. Thus, the cost of the switching power supply circuit according to the embodiment as a power supply circuit having a power factor improving function can be made much lower than that of the circuit shown in FIG. 26. In addition, since the number of parts is greatly reduced, a circuit board can be effectively reduced in size and weight.

In this case, the leakage inductance L3 occurring at the choke coil primary winding NC1 is a low value of 82 μH. Further, it suffices to have only one switching element Q1 as switching element. Therefore device size and weight can be reduced. Further, it is possible to optimize the power factor improving section (approximate the power factor to one) while making the value of the leakage inductance L3 an optimum value (the value of the leakage inductance L3 that makes the primary side first series resonance frequency the primary side second series resonance frequency) by adjusting the ratio between the choke coil primary winding NC1 and the choke coil secondary winding NC2 of the choke transformer VFT.

In addition, in the switching power supply circuit according to the embodiment, the operation of the multiple resonant converter section and the power factor improving section is a so-called soft switching operation, and therefore the level of switching noise is greatly reduced as compared with the circuit using the active filter shown in FIG. 26. In particular, because the current input to the class E switching converter can be approximated to direct current, the level of the switching noise can be made very low.

Further, the switching circuit according to the embodiment has the primary side series resonant circuits and the primary side parallel resonant circuit as well as a secondary side series resonant circuit. Therefore, the secondary side direct-current output voltage Eo can be maintained at a predetermined voltage level by very slight changes in frequency, so that the noise filter can be designed easily. For this reason, the noise filter in one stage composed of one common mode choke coil CMC and two across capacitors CL suffices to meet power supply interference standards. In addition, a sufficient measure against the normal mode noise of the rectification output line can be taken by the single filter capacitor CN.

Further, rectifier diodes Do1 to Do4 on the secondary side and the like operate in synchronism with the switching element Q1. Therefore ground potential interference between the active filter side and the switching converter in the subsequent stage as in the power supply circuit of FIG. 26 does not occur, and ground potential is stabilized irrespective of changes in switching frequency.

Sixth Embodiment

Figure 16:
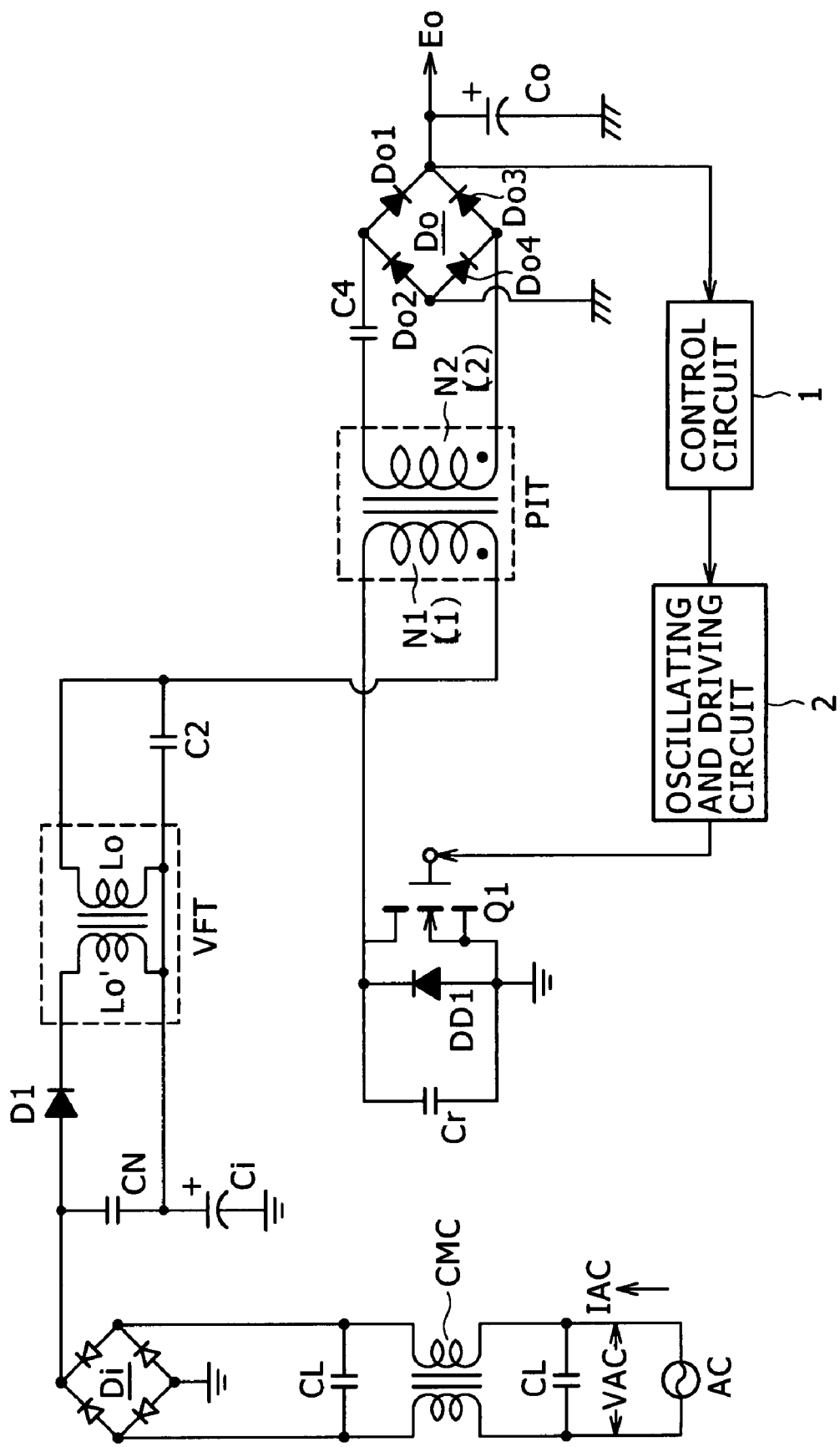
FIG. 16 is a circuit diagram showing an example of configuration of a power supply circuit according to an embodiment.

In a switching power supply circuit according to a sixth embodiment shown in FIG. 16, same parts as in the fifth embodiment are identified by the same reference numerals, and description thereof will be omitted. The switching power supply circuit according to the sixth embodiment employs same configurations as in the fifth embodiment in many parts. The sixth embodiment is different from the fifth embodiment in that a current path of a primary side first series resonant circuit of a converter section is formed by only a choke coil primary winding NC1 and a primary side series resonant capacitor C2, a current path in one direction of a primary side second series resonant circuit is a path from a smoothing capacitor Ci through the primary side series resonant capacitor C2 to a primary winding N1 and then from the drain to the source of a switching element Q1, and a current path in another direction of the primary side second series resonant circuit is a path from a body diode DD1 of the switching element Q1 through the primary winding N1 and the primary side series resonant capacitor C2 to the smoothing capacitor Ci. A power factor improving section uses a slow rectifying element as a primary side rectifying element Di, and a fast rectifying element D1 is connected to the output side of the primary side rectifying element Di, so that a current corresponding to a voltage occurring in the primary side series resonant capacitor C2 is passed from an alternating-current power supply AC via the fast rectifying element D1.

The converter section in the sixth embodiment is the same as in the first to fifth embodiments in that ZVS operation is performed with the resonance frequency of the primary side first series resonant circuit set at substantially twice the resonance frequency of the primary side second series resonant circuit. The power factor improving section in the sixth embodiment is the same as in the fourth embodiment in that the current corresponding to the voltage occurring in the primary side series resonant capacitor C2 is passed from the alternating-current power supply AC via the fast rectifying element D1.

(Examples of Modification of Secondary Side Circuits)

FIGS. 17 to 23 show examples of modification of the secondary side circuits that are replaceable in the switching power supply circuits according to the first to sixth embodiments.

Figure 17:
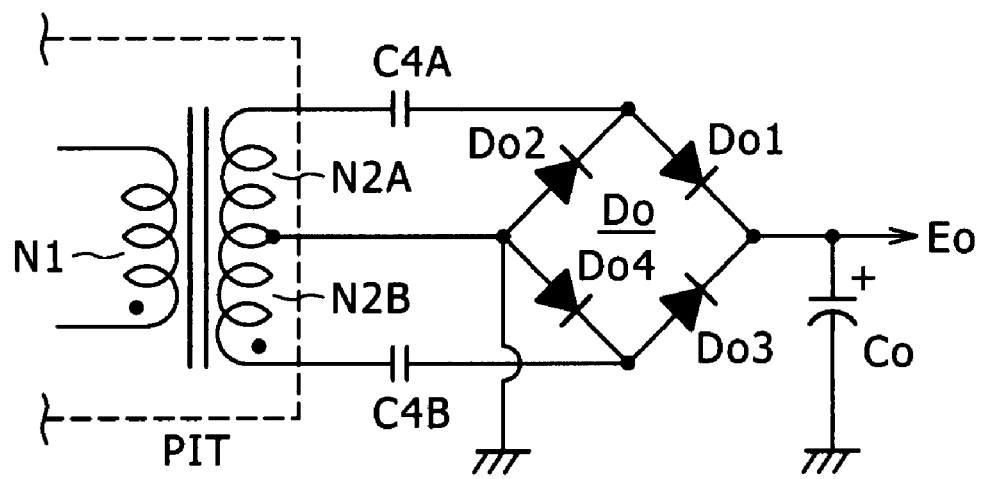
FIG. 17 shows an example of modification of a secondary side circuit according to an embodiment.

A secondary side rectifier circuit shown in FIG. 17 forms a voltage doubler full-wave rectifier circuit. Specifically, a secondary winding is provided with a center tap to be divided into two parts, that is, a secondary winding part N2A and a secondary winding part N2B with the center tap as a boundary. The same number of turns is set for the secondary winding part N2A and the secondary winding part N2B. The center tap of the secondary winding N2 is connected to a secondary side ground. A secondary side series resonant capacitor C4A is connected in series with a terminal part on the secondary winding part N2A side of the secondary winding N2. A secondary side series resonant capacitor C4B having a same capacitance as the secondary side series resonant capacitor C4A is connected in series with a terminal part on the secondary winding part N2B side of the secondary winding N2. Thereby, the leakage inductance component of the secondary winding part N2A and the capacitance of the secondary side series resonant capacitor C4A form a first secondary side series resonant circuit, and the leakage inductance component of the secondary winding part N2B and the capacitance of the secondary side series resonant capacitor C4B form a second secondary side series resonant circuit having substantially the same resonance frequency as the first secondary side series resonant circuit.

The terminal part on the secondary winding part N2A side of the secondary winding N2 is connected to a point of connection between the anode of a rectifier diode Do1 and the cathode of a rectifier diode Do2 via the series connection of the secondary side series resonant capacitor C4A. In addition, the terminal part on the secondary winding part N2B side of the secondary winding N2 is connected to a point of connection between the anode of a rectifier diode Do3 and the cathode of a rectifier diode Do4 via the series connection of the secondary side series resonant capacitor C4B. The respective cathodes of the rectifier diode Do1 and the rectifier diode Do3 are connected to the positive electrode terminal of a smoothing capacitor Co. The negative electrode terminal of the smoothing capacitor Co is connected to the secondary side ground. A point of connection between the respective anodes of the rectifier diode Do2 and the rectifier diode Do4 are connected to the secondary side ground.

Thus, the secondary winding part N2A, the secondary side series resonant capacitor C4A, the rectifier diode Do1, the rectifier diode Do2, and the smoothing capacitor Co form a first voltage doubler half-wave rectifier circuit including the first secondary side series resonant circuit, and the secondary winding part N2B, the secondary side series resonant capacitor C4B, the rectifier diode Do1, the rectifier diode Do2, and the smoothing capacitor Co form a second voltage doubler half-wave rectifier circuit including the second secondary side series resonant circuit. Thus the smoothing capacitor Co is charged with a rectified current by a potential obtained by superimposing a voltage induced in the secondary winding part N2B on a voltage across the secondary side series resonant capacitor C4B in a half period in which the alternating voltage of the secondary winding N2 is of one polarity. The smoothing capacitor Co is charged with a rectified current by a potential obtained by superimposing a voltage induced in the secondary winding part N2A on a voltage across the secondary side series resonant capacitor C4A in a half period in which the alternating voltage of the secondary winding N2 is of another polarity. Thereby a secondary side direct-current output voltage Eo having a level corresponding to twice the level of the voltage induced in the secondary winding part N2A and the secondary winding part N2B is obtained as voltage across the smoothing capacitor Co. That is, a voltage doubler full-wave rectifier circuit is obtained.

Figure 18:
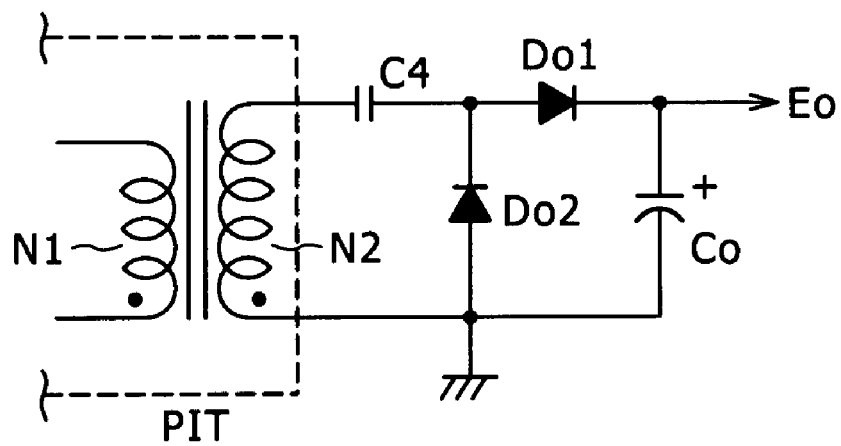
FIG. 18 shows an example of modification of a secondary side circuit according to an embodiment.

A secondary side rectifier circuit shown in FIG. 18 forms a voltage doubler half-wave rectifier circuit. Specifically, the leakage inductance component of a secondary winding N2 and the capacitance of a secondary side series resonant capacitor C4 form a secondary side series resonant circuit. A voltage of one polarity generated in the secondary winding N2 charges the secondary side series resonant capacitor C4 via a rectifier diode Do2, and a voltage of another polarity charges a smoothing capacitor Co via a rectifier diode Do1. The voltage with which the secondary side series resonant capacitor C4 is charged and the voltage with which the smoothing capacitor Co is charged are added together, so that a level corresponding to twice the level of voltage induced in the secondary winding N2 is obtained. That is, a voltage doubler half-wave rectifier circuit is obtained.

Figure 19:
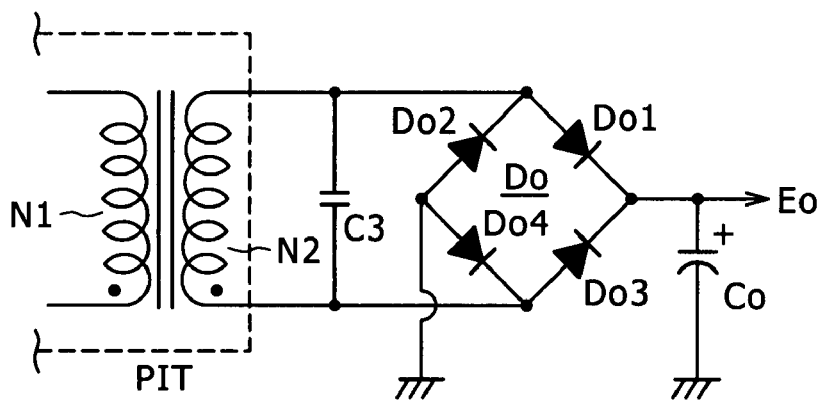
FIG. 19 shows an example of modification of a secondary side circuit according to an embodiment.

A secondary side rectifier circuit shown in FIG. 19 is a full-wave rectifier circuit including rectifier diodes Do1 to Do4 with a partial voltage resonant circuit formed by a partial voltage resonant capacitor C3 and the leakage inductance component of a secondary winding N2. When the value of the partial voltage resonant capacitor C3 is increased, the partial voltage resonant capacitor C3 functions as parallel resonant capacitor, and the secondary side rectifier circuit operates with a parallel voltage resonant circuit formed by the parallel resonant capacitor C3 and the leakage inductance component of the secondary winding N2.

Figure 20:
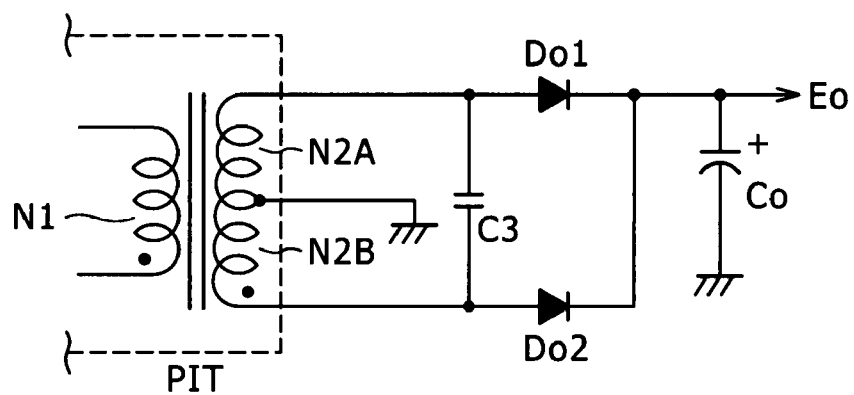
FIG. 20 shows an example of modification of a secondary side circuit according to an embodiment.

A secondary side rectifier circuit shown in FIG. 20 is a center tap double-wave rectifier circuit including a rectifier diode Do1 and a rectifier diode Do2 with a partial voltage resonant circuit formed by a partial voltage resonant capacitor C3 and the leakage inductance components of a secondary winding part N2A and a secondary winding part N2B. When the value of the partial voltage resonant capacitor C3 is increased, the partial voltage resonant capacitor C3 functions as parallel resonant capacitor, and the secondary side rectifier circuit operates with a parallel voltage resonant circuit formed by the parallel resonant capacitor C3 and the leakage inductance component of the secondary winding N2.

Figure 21:
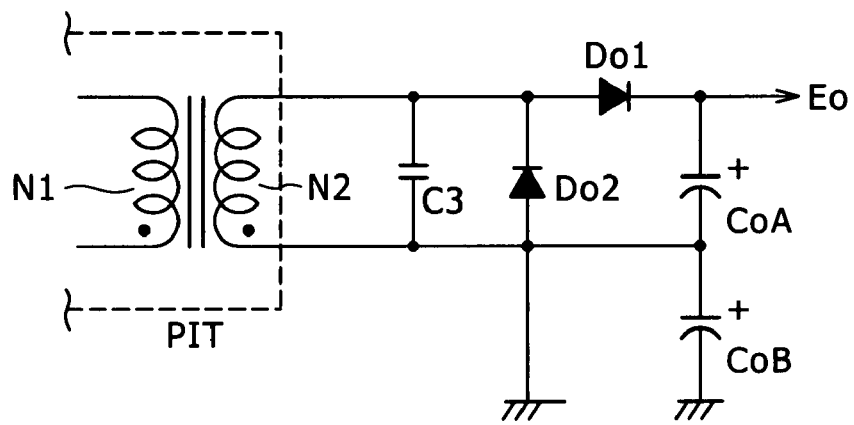
FIG. 21 shows an example of modification of a secondary side circuit according to an embodiment.

A secondary side rectifier circuit shown in FIG. 21 is a voltage doubler rectifier circuit including a rectifier diode Do1, a rectifier diode Do2, a smoothing capacitor CoA, and a smoothing capacitor CoB with a partial voltage resonant circuit formed by a partial voltage resonant capacitor C3 and a leakage inductance component occurring at a secondary winding N2. When the value of the partial voltage resonant capacitor C3 is increased, the partial voltage resonant capacitor C3 functions as parallel resonant capacitor, and the secondary side rectifier circuit operates with a parallel voltage resonant circuit formed by the parallel resonant capacitor C3 and the leakage inductance component of the secondary winding N2.

It is to be noted that while the concrete examples of design of the power supply circuits according to the embodiments described thus far assume that commercial alternating-current power is input at an alternating input voltage VAC of 100 V, the present invention is not particularly limited to the value of the alternating input voltage VAC. For example, also in a case of designing a power supply circuit ready for input of 200-V commercial alternating-current power, similar effects can be obtained by using a configuration based on the present invention. In addition, as for circuit forms of details of the primary side voltage resonant converter and the configuration of the secondary side rectifier circuit including the secondary side series resonant circuit, for example, other circuit forms and other configurations are conceivable. Further, as the switching element, an element other than a MOS-FET, such for example as an IGBT (Insulated Gate Bipolar Transistor) and a bipolar transistor may be selected. In addition, while each of the above-described embodiments employs the externally excited switching converter, the present invention is applicable to cases where the switching converter is formed as a self-excited switching converter.

It should be understood by those skilled in the art that various modifications, combinations, sub-combinations and alterations may occur depending on design requirements and other factors insofar as they are within the scope of the appended claims or the equivalents thereof.

The invention claimed is:

1. A switching power supply circuit comprising:
a rectifying and smoothing section for converting an alternating input voltage from an alternating-current power supply into a primary side direct-current voltage;
a converter section for converting the primary side direct-current voltage from said rectifying and smoothing section into an alternating voltage and further converting the alternating voltage into a secondary side direct-current voltage; and
a power factor improving section for improving a power factor;
wherein said rectifying and smoothing section includes a primary side rectifying element for rectifying said alternating input voltage and a smoothing capacitor for smoothing rectified output from said primary side rectifying element, and supplies said primary side direct-current voltage,
said converter section includes:
a choke coil having one terminal connected to said smoothing capacitor,
a converter transformer having a primary winding on a primary side, the primary winding being connected to another terminal of said choke coil, and a secondary winding on a secondary side, the secondary winding being magnetically loosely coupled with said primary winding,
a switching element for switching said primary side direct-current voltage supplied via the primary winding of said converter transformer,
an oscillating and driving circuit for on-off driving of said switching element,
a control circuit for supplying said oscillating and driving circuit with a control signal to make a value of said secondary side direct-current voltage output by a secondary side rectifier circuit connected to the secondary winding of said converter transformer a predetermined value,
a primary side series resonant capacitor having a predetermined capacitance, the primary side series resonant capacitor having one terminal connected to a point of connection between said choke coil and said primary winding, whereby the primary side series resonant capacitor is connected in series with one of said choke coil and said primary winding, said predetermined capacitance being set such that a primary side first series resonance frequency of a primary side first series resonant circuit, the primary side first series resonance frequency being governed by an inductance of said choke coil and said predetermined capacitance, is substantially twice a primary side second series resonance frequency of a primary side second series resonant circuit, the primary side second series resonance frequency being governed by a leakage inductance occurring at said primary winding and said predetermined capacitance, and
a primary side parallel resonant capacitor having a predetermined capacitance, the primary side parallel resonant capacitor being connected in parallel with said switching element, said predetermined capacitance being set such that a primary side parallel resonance frequency governed by the inductance of said choke coil, the leakage inductance occurring at said primary winding, and said predetermined capacitance is substantially twice the primary side first series resonance frequency, and
said power factor improving section adds and passes a current corresponding to a voltage generated in said primary side series resonant capacitor to said smoothing capacitor via said primary side rectifying element.

2. The switching power supply circuit as claimed in claim 1,
wherein said power factor improving section has an inductor connected between said primary side rectifying element and said smoothing capacitor, and another terminal of said primary side series resonant capacitor is connected to a point of connection between said inductor and said primary side rectifying element.

3. The switching power supply circuit as claimed in claim 2,
wherein said choke coil is used as said inductor.

4. The switching power supply circuit as claimed in claim 2,
wherein said choke coil is formed as a leakage inductance occurring at a primary winding of a choke transformer, the choke transformer being formed with the primary winding and a secondary winding magnetically loosely coupled with each other, and
the current corresponding to the voltage generated in said primary side series resonant capacitor flows via the secondary winding of said choke transformer.

5. The switching power supply circuit as claimed in claim 1,
wherein said primary side rectifying element is formed by a fast rectifying element having a switching speed for responding to frequencies of currents flowing through said primary side first series resonant circuit and said primary side second series resonant circuit.

6. The switching power supply circuit as claimed in claim 1,
wherein said primary side rectifying element is formed by a slow rectifying element having a switching speed for responding to frequency of input alternating-current power from said alternating-current power supply, and
a fast rectifying element having a switching speed for responding to frequencies of currents flowing through said primary side first series resonant circuit and said primary side second series resonant circuit is connected in series with an output side of said slow rectifying element.

7. The switching power supply circuit as claimed in claim 1,
wherein the secondary side rectifier circuit connected to said secondary winding of said converter transformer has a secondary side resonant capacitor having a predetermined capacitance, and a secondary side resonant circuit whose resonance frequency is governed by a leakage inductance occurring at said secondary winding and said predetermined capacitance is formed.

8. The switching power supply circuit as claimed in claim 7,
wherein said secondary side resonant capacitor is a series resonant capacitor connected in series with the secondary winding of said converter transformer, and forms a secondary side series resonant circuit together with the leakage inductance occurring at said secondary winding.

9. The switching power supply circuit as claimed in claim 7,
wherein said secondary side resonant capacitor is a partial voltage resonant capacitor connected in parallel with the secondary winding of said converter transformer, and forms a secondary side partial voltage resonant circuit together with the leakage inductance occurring at said secondary winding.

* * * * *